Figure 1:
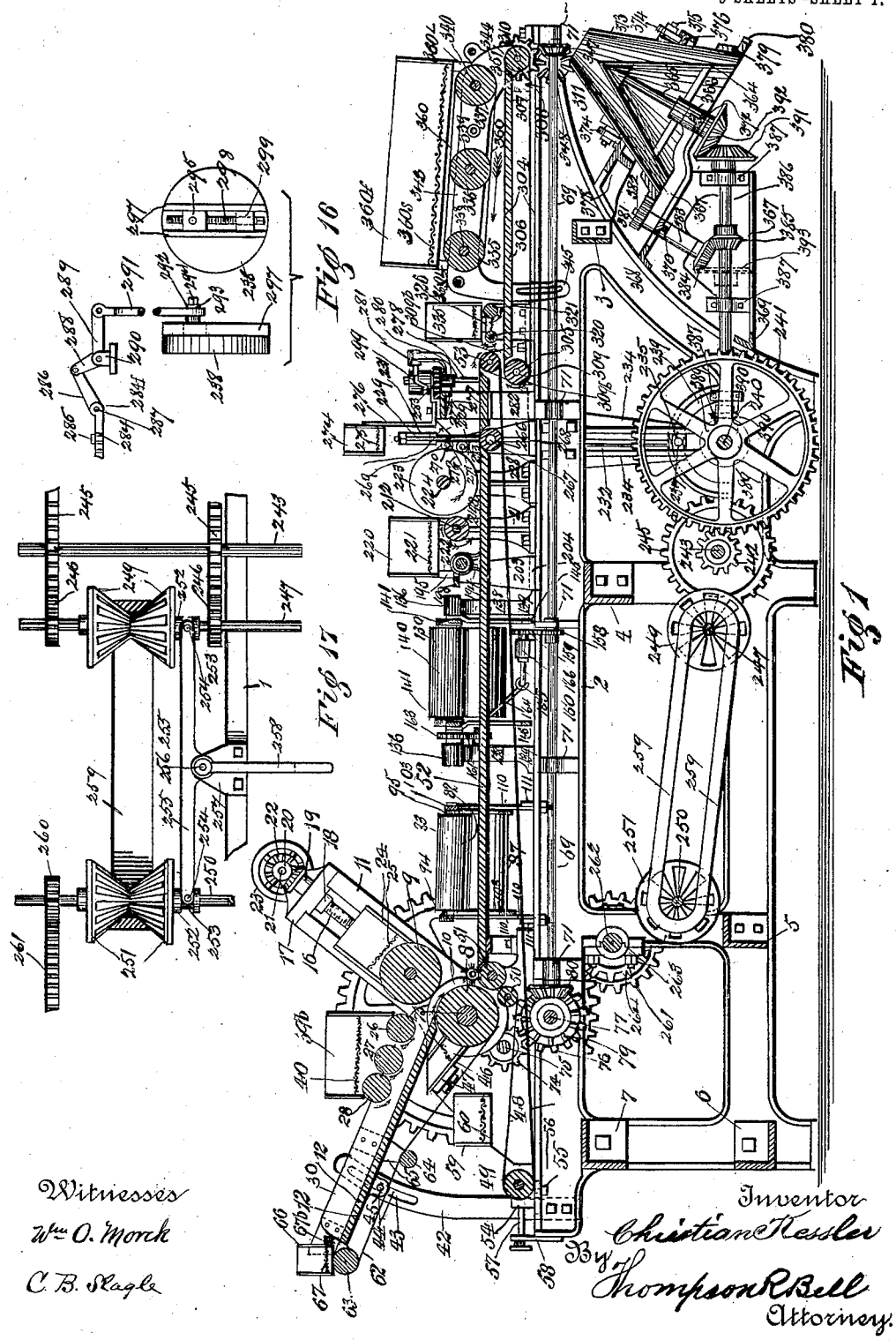

No. 745,018. PATENTED NOV. 24, 1903.
C. KESSLER.
BREAD MAKING MACHINE.
APPLICATION FILED MAY 26, 1902.
NO MODEL. 9 SHEETS—SHEET 1.

Witnesses
W<u>m</u> O. Morck
C. B. Slagle

Inventor
Christian Kessler
By Thompson R Bell
Attorney.

No. 745,018. PATENTED NOV. 24, 1903.
C. KESSLER.
BREAD MAKING MACHINE.
APPLICATION FILED MAY 26, 1902.
NO MODEL. 9 SHEETS—SHEET 2.

Witnesses
Wm. O. Mork
C. B. Slagle

Inventor
Christian Kessler
Thompson R Bell
Attorney.

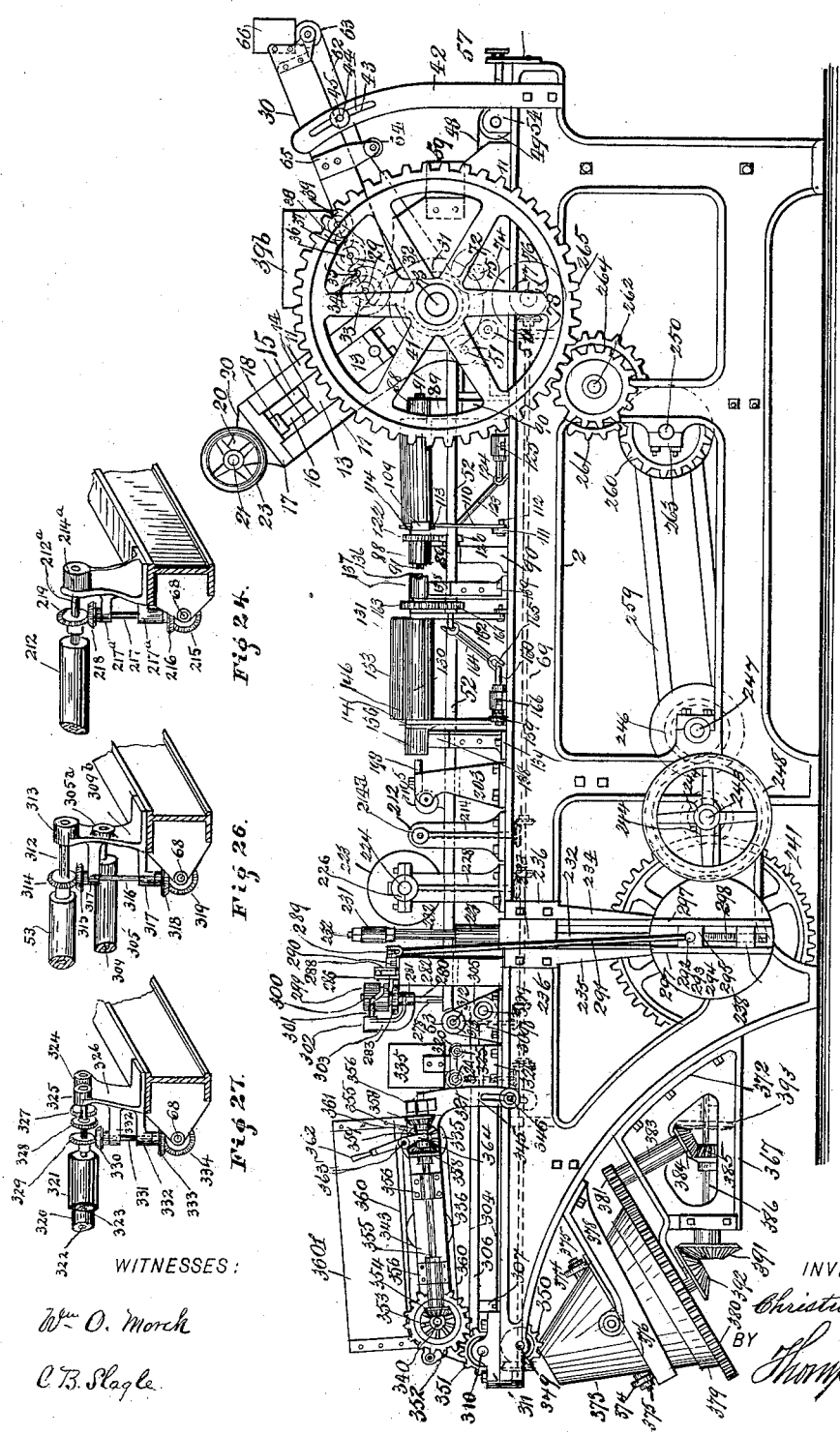

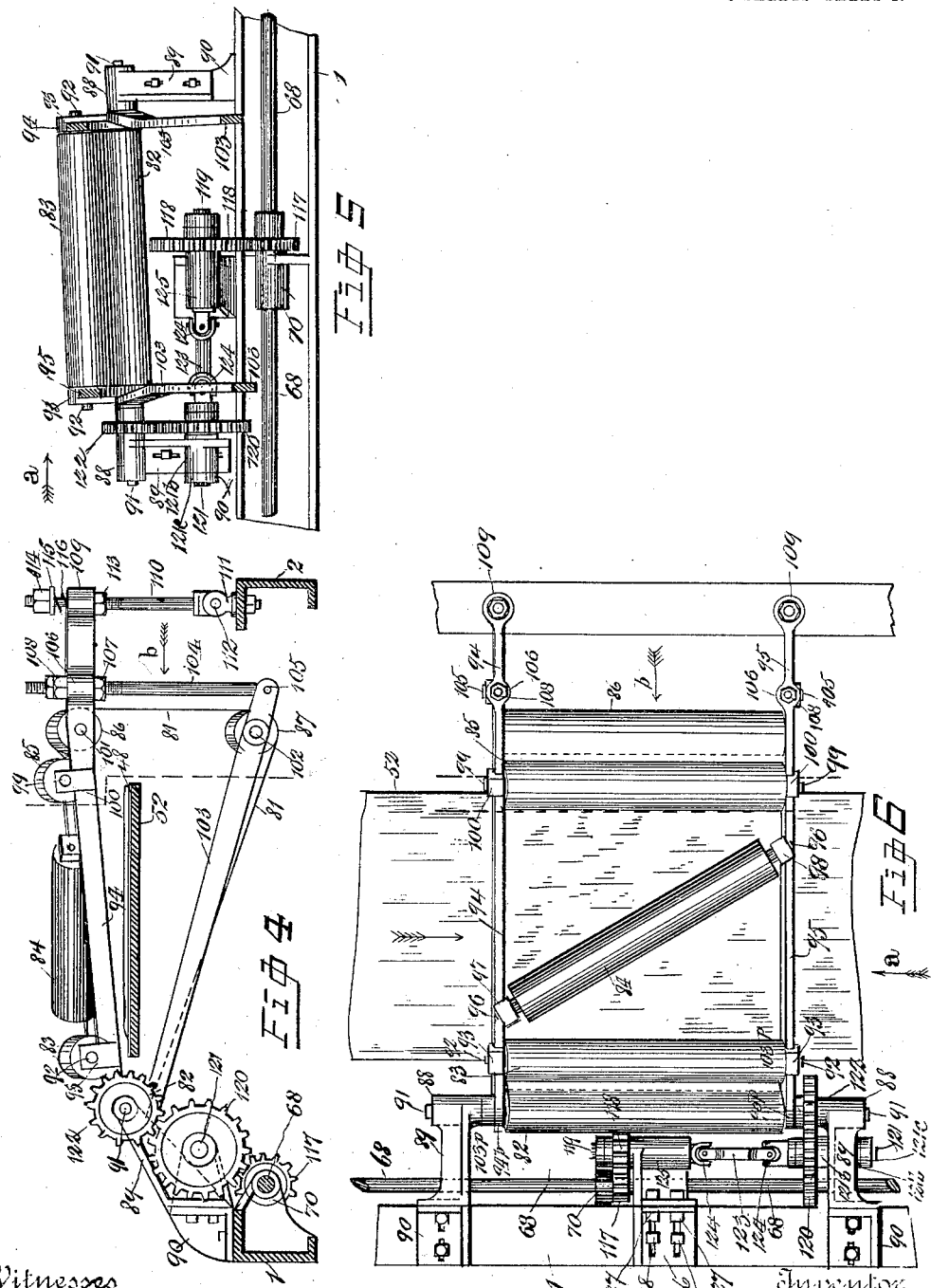

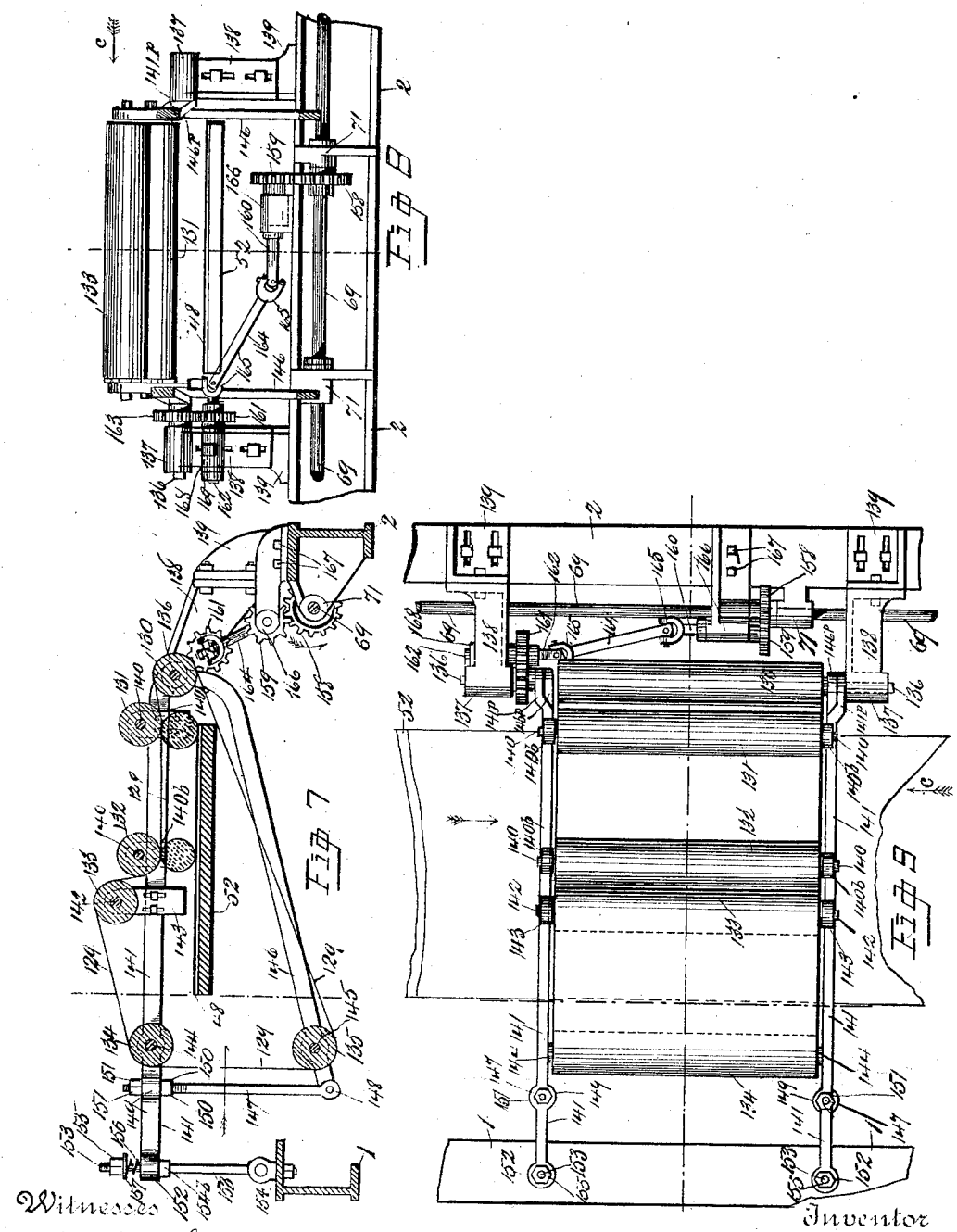

No. 745,018. PATENTED NOV. 24, 1903.
C. KESSLER.
BREAD MAKING MACHINE.
APPLICATION FILED MAY 26, 1902.
NO MODEL. 9 SHEETS—SHEET 6.
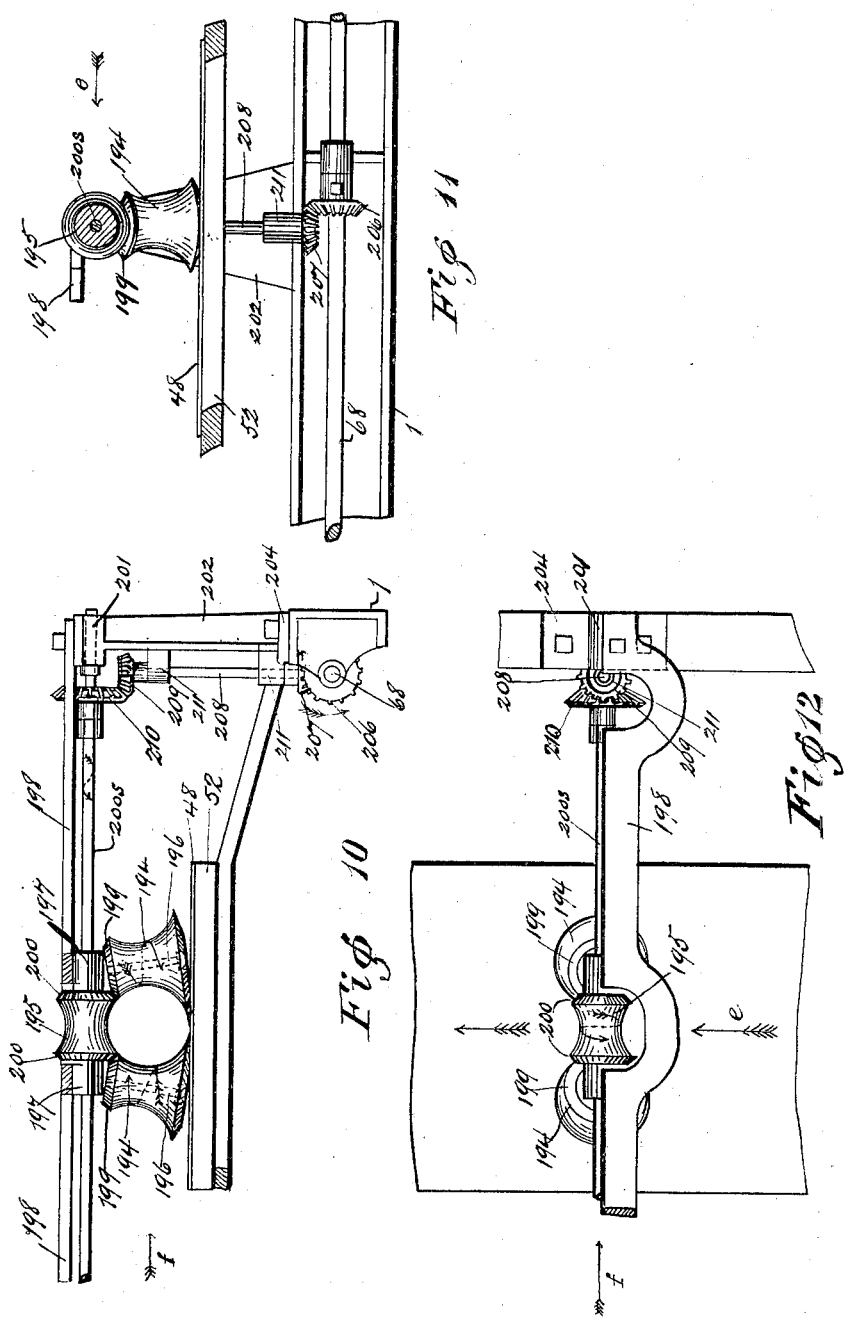
Witnesses
Wm O. Morck
C B Slagle
Inventor
Christian Kessler
By Attorney Thompson &...

No. 745,018. PATENTED NOV. 24, 1903.
C. KESSLER.
BREAD MAKING MACHINE.
APPLICATION FILED MAY 26, 1902.
NO MODEL. 9 SHEETS—SHEET 7.
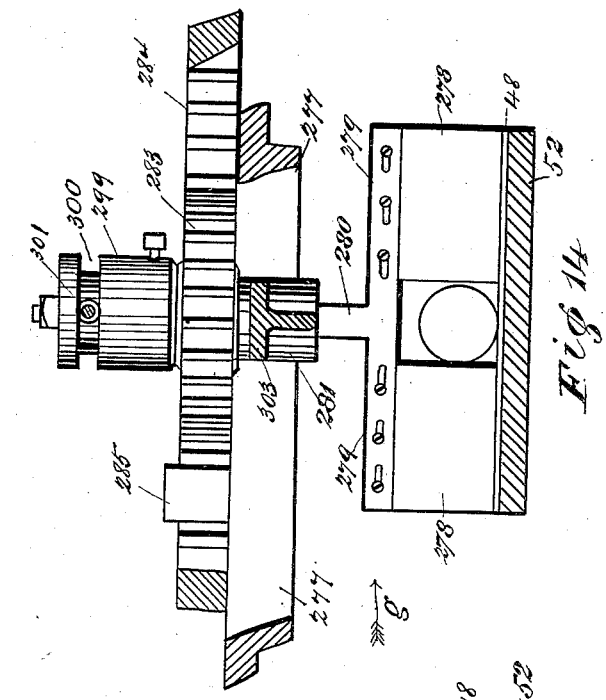
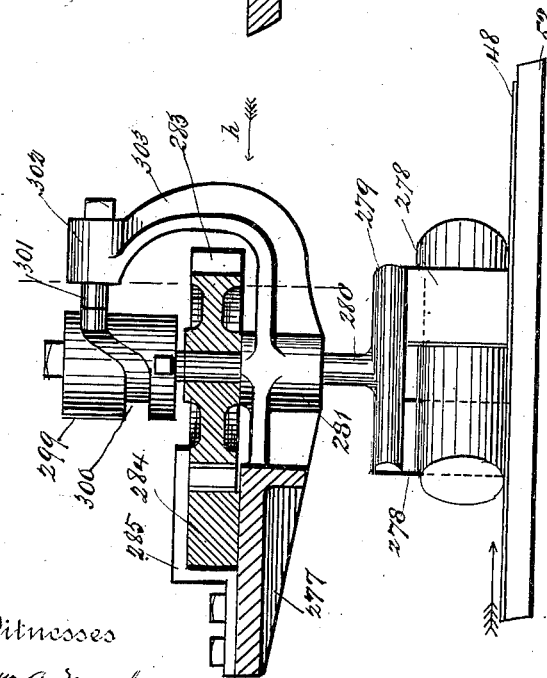
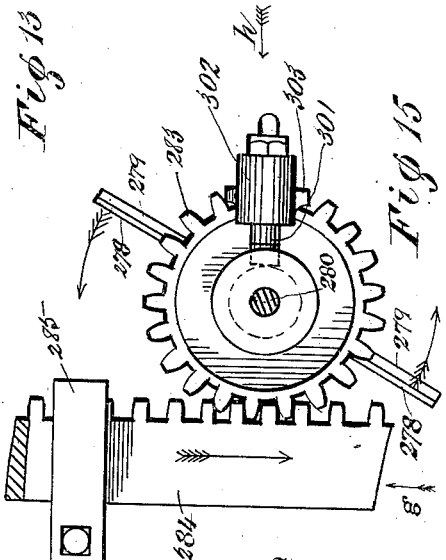
Witnesses
Wm. O. Monk
C. B. Slagle
Inventor
Christian Kessler
By Attorney Thompson & Bell No. 745,018. PATENTED NOV. 24, 1903.
C. KESSLER.
BREAD MAKING MACHINE.
APPLICATION FILED MAY 26, 1902.
NO MODEL. 9 SHEETS—SHEET 9.

WITNESSES:
Wm. O. Monk
C. B. Slagle.

INVENTOR
Christian Kessler
BY Thompson C. Bell
ATTORNEY

No. 745,018. Patented November 24, 1903.

UNITED STATES PATENT OFFICE.

CHRISTIAN KESSLER, OF INDIANAPOLIS, INDIANA.

BREAD-MAKING MACHINE.

SPECIFICATION forming part of Letters Patent No. 745,018, dated November 24, 1903.

Application filed May 26, 1902. Serial No. 109,107. (No model.)

*To all whom it may concern:*

Be it known that I, CHRISTIAN KESSLER, a citizen of the United States, residing at Indianapolis, in the county of Marion and State of Indiana, have invented new and useful Improvements in Bread-Making Machines, of which the following is a specification.

My invention relates to certain new and useful improvements in machinery for automatically forming and molding loaves of bread; and it consists in the mechanism and means employed for performing the various operations necessary to form the loaves of bread and to divide the dough into parts of equal size and weight and to form and prepare such divided portions ready to be placed in the baking-oven.

The object of this my invention is, first, to prepare the dough by specially arranged and designed mechanism, as reducing-rollers, to be rolled into a continuous sliver of uniform weight and size, then conducting said dough from said rollers and while being thus conducted to roll the same into a continous roll or cylinder of uniform diameter, density, and weight, then conducting said roll of dough to, into, and through a suitable die or die-rollers, then rolling out or flattening said continuous roll or cylinder of dough and dressing the edges of the same to a uniform width, then to provide suitable means whereby the dough thus formed will be divided or separated into parts or loaves of equal sizes and weight and similar forms, and, finally, to provide means whereby the dough throughout its passage through the machine will be thoroughly floured or dusted and formed or finished by suitably-formed finishing mechanism or forming-rollers and delivered completely formed, ready to be placed in a baking-oven. I attain these objects by means of the mechanism illustrated in the accompanying drawings, in which similar numerals of reference designate like parts throughout the several views.

Figure 2:
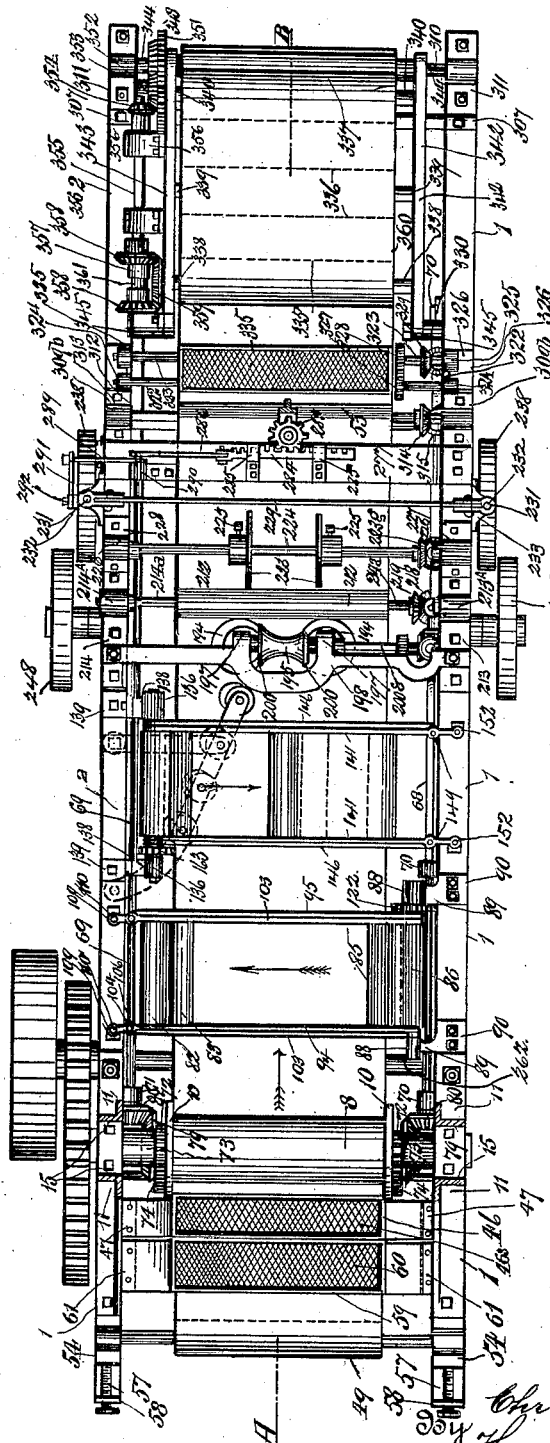
Figure 18:
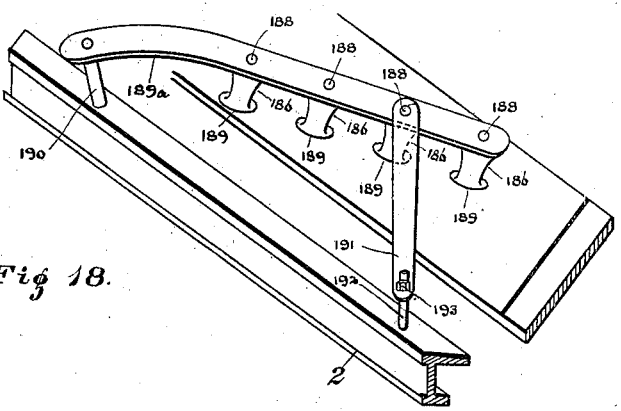
Figure 19:
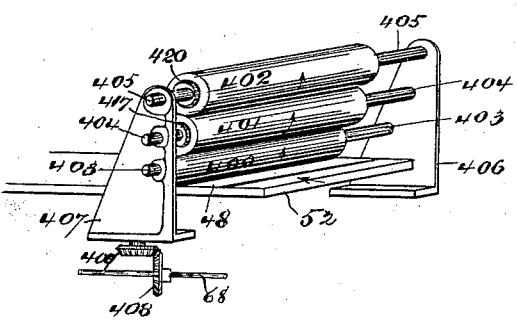
Figure 20:
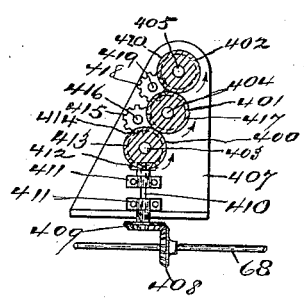
Figure 25:
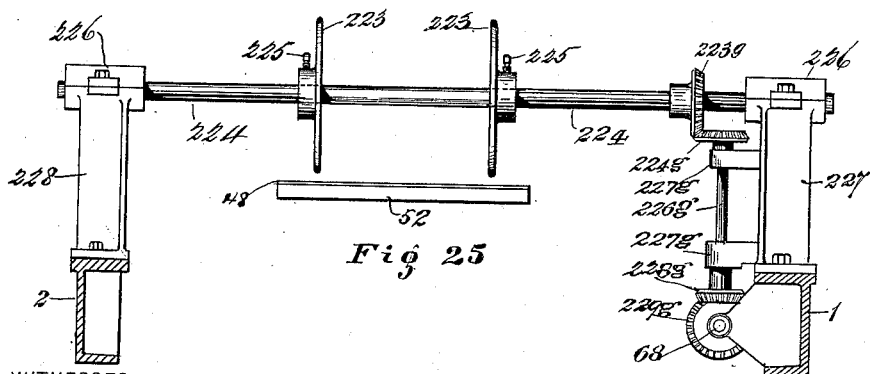
Figure 28:
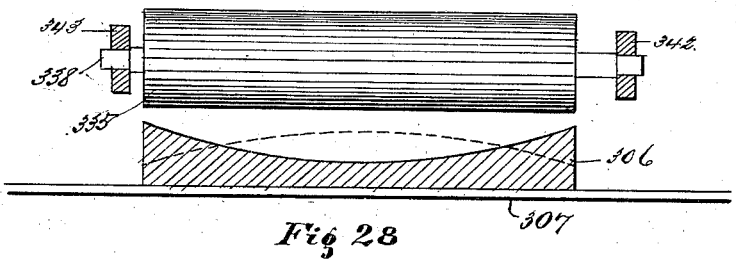
Figure 29:
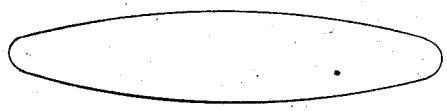
Figure 30:
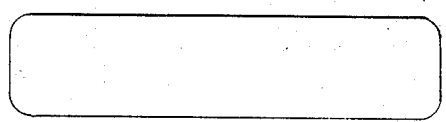
Figure 21:
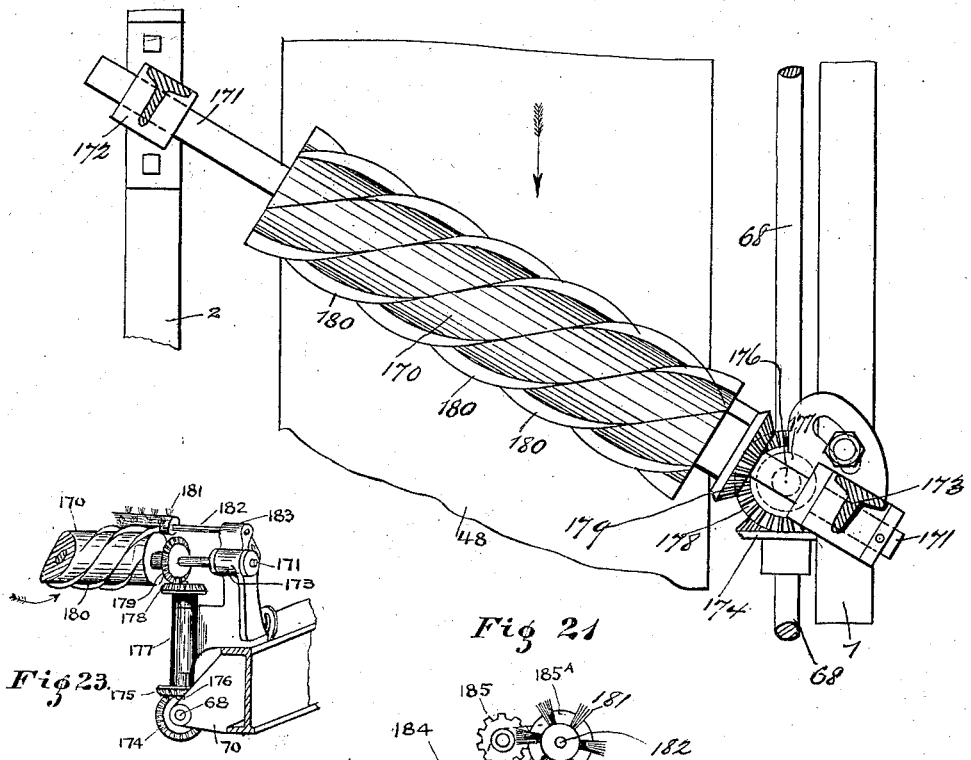
Figure 23:
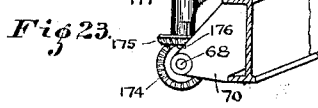
Figure 22:
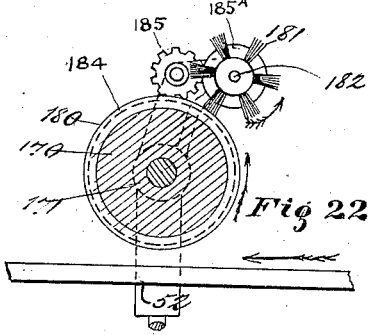

Figure 1 is a side sectional elevational view of the machine and taken through the line A B. (See Fig. 2.) Fig. 2 is a plan view of the same. Fig. 3 is a side elevational view of the same, showing the driving side of the machine. Fig. 4 is an enlarged detail end view of the folding or rolling apron and looking in the direction of the arrow *a*. (See Figs. 5 and 6.) Fig. 5 is an enlarged detail side view of the same and looking in the direction of the arrow *b*. (See Figs. 4 and 5.) Fig. 6 is a plan view of the same. Fig. 7 is an enlarged detail end view of the centering or conducting apron and looking in the direction of the arrow *c*. (See Figs. 8 and 9.) Fig. 8 is an enlarged detail side view of the same looking in the direction of the arrow *d*. (See Figs. 7 and 9.) Fig. 9 is a plan view of the same. Fig. 10 is an enlarged detail elevational view of the die or forming rollers looking in the direction of the arrows *e*. (See Figs. 11 and 12.) Fig. 11 is an end elevational view of the same looking in the direction of the arrows *f*. (See Figs. 10 and 12.) Fig. 12 is a plan view of the same. Fig. 13 is an enlarged detail part sectional elevational view of the dough-turning mechanism looking in the direction of the arrows *g*. (See Figs. 14 and 15.) Fig. 14 is a similar elevational view of the same looking in the direction of the arrows *h*. (See Figs. 13 and 15.) Fig. 15 is a plan view of the same. Fig. 16 is a detail view of the mechanism for operating the mechanism for turning the divided portions of dough after leaving the dividing-knife. Fig. 17 is a detail plan view of the variable-speed driving mechanism for driving the dividing-knife. Fig. 18 is an enlarged detail view of the dough-conducting arm, whereby the rolled dough as it leaves the folding or rolling apron is conducted to the die-rollers, and the same may be substituted for the secondary or conducting apron. Fig. 19 is a detail view of the folding or dough-rolling rollers and which may be substituted for the primary or dough folding or rolling apron. Fig. 20 is an end sectional view of the same. Fig. 21 is a plan view of another form of folding-roller, showing the spirally-arranged folding-blades thereof. Fig. 22 is an end sectional view of the same. Fig. 23 is a detail perspective view of the same. Fig. 24 is a detail perspective view of the flattening-roller and showing the arrangement of the driving-gear of the same. Fig. 25 is an enlarged detail end view of the trimming-disks and showing the driving-gear for rotating or driving the same. Fig. 26 is a detail perspective view of the primary receiving traversing and the secondary receiving traversing apron-rollers and showing the arrangement of driving-gearing for driving the primary traversing apron-roller. Fig. 27 is a perspective view of the rear conducting and working rollers and the driving-gearing for rotating the same. Fig. 28 is a detail transverse sectional elevational view of the loaf-forming rollers and their forming-table, and Figs. 29 and 30 are views of different forms of loaves made by using the different forms of forming-tables.

The main frame of the machine is composed of the side frames 1 and 2, which are maintained in vertical position and parallel to each other by suitable distance-beams 3, 4, 5, 6, and 7.

The dough-receiving or feed rollers consist of the master or fixed roller 8 and the upper or adjustable roller 9, and said roller 8 is preferably provided with suitable end flanges 10, which are provided for the purpose of preventing the pliable dough as it is passed between said upper and lower rollers 8 and 9 spreading out beyond the contacting surfaces of said rollers, and the said roller 8 has its ends journaled in suitable box-bearings fitted in and supported by the standards 11, which latter are firmly and securely bolted to the top of the frames 1 and 2. A continuously-rotating stripping-brush 8' is journaled on the delivery side of and contiguous to the lower one of the dough-reducing rollers, and by this brush the dough is effectually stripped or removed from the delivery side of said rollers as the same is discharged upon the apron 48. The top or adjustable feed-roller 9 is situated slightly in advance of the bottom roller 8 for the purpose of exposing a greater surface of the said roller 9 to the dough as it is fed from the hopper-board 12, hereinafter described, and the said roller 9 has its end journals journaled in suitable box-bearings 13, which latter are adapted to slide in the inclined ways 15, formed in the standard 11. The box-bearings 13 are each caused to be moved simultaneously and through equal distances to raise or lower said roller 9 by the adjusting-screws 16, which latter are journaled at their top ends in the braces 17, and said screws are prevented from moving longitudinally in their bearings by the collars 18, which latter bear against the bottom sides of the braces 17 and by the hubs of the bevel-gears 19, which bear on the opposite sides of said braces, and the latter gears are secured on the top ends of said screws 16 to turn therewith, and the bottom or screw-threaded ends of said screws 16 are screwed into the top ends 14 of the boxes 13. The braces 17 are securely bolted to and on the top ends of the standards 11, and the said braces are provided with the end bearings 20, which are formed integral thereon, and in these bearings the hand-shaft 21 is adapted to rotate. The hand-shaft 21 is provided with the bevel-gears 22, which are keyed or otherwise secured on said shaft to turn therewith, and said bevel-gears mesh with the bevel-gears 19 to turn the screws 16 simultaneously. A suitable hand-wheel 23 is secured on either end of the said hand-shaft 21 and by means of which the latter shaft is turned when it is required to change or adjust the position of the roller 9. A flour-box 24, having its top and bottom ends open, is secured at its ends to and between the box-bearings 13 in such a position that the bottom open side of said flour-box is closed by the roller 9, thereby exposing the surface of the latter to contact with the flour contained in said flour-box 24 to receive a regular and even coating of flour to prevent the dough with which it contacts adhering to its surface. A flour-sieve 25 extends along the interior of the box 24 and is provided for the purpose of preventing the entire body of the flour contained in said flour-box contacting directly with said roller and being wasted. The equalizing-rollers 26, 27, and 28 are journaled at their ends in suitable journal-boxes 29, secured to the sides 30 of the feed or hopper table 12, and said rollers are driven positively by the gear-wheel 31, secured on the projecting end of one of the journals of the roller 8, meshing with the gear-wheel 32 on the roller 26, and the said wheel 33 meshes with the gear-wheel or idler 34, journaled on the fixed stud 35, and said idler meshes with the gear-wheel 36, secured on the prolonged end journal of the roller 27, and this latter wheel meshes with the intermediate or idler 37, journaled on the fixed stud 38, and the latter idler 38 meshes with the gear-wheel 39, secured on the prolonged end of the journal of the equalizing-roller 28, and thus the said equalizing-rollers 26, 27, and 28 are driven simultaneously and in the same direction of rotation. A flour-box 39$^b$, having its top and bottom ends open, is supported in any suitable manner by any suitable securing means in a position so that its open bottom end will be directly over the equalizing-rollers 26, 27, and 28, and extending along and across the interior of the said flour-box 39$^b$ is the flour-sieve 40, and the said flour-box 39$^b$, having the sieve 40, is provided for the purpose of dusting or coating the said equalizing-rollers 26, 27, and 28 with a light uniform layer of flour to prevent the dough as it passes under them from sticking to their surfaces.

An adjustable hopper-board or table 12, having the sides 30, is provided with the forward side-supporting arms 41, which are hinged or pivoted on the inner collars formed on the ends of the fixed or master roller 8 to permit the hopper-board or table 12 to be tilted or inclined at varying angles, and the segmental vertically-extending arms 42, secured to the side frames 1 and 2, having the slotted boltway 43, through which the securing-bolts 44 pass, with nuts 45, are provided for the purpose of adjustably and securely supporting the tilting end of said hopper-board or table 12 in any angle of inclination. A flour-box 46, having its top and bottom ends open, is bolted or otherwise firmly secured at its ends to the lugs 47, formed integral on the inner sides of the standards 11, and in such position relatively to the fixed feed-roller 8 that the bottom open side thereof is closed by the latter roller, thereby exposing the surface of said roller to contact with the flour contained in said flour-box 46, as and for the same purpose described in connection with the flour-boxes 24 and $39^b$. An endless traversing apron 48 extends from the front apron or tension-roller 49 and is conducted by the guide-rollers 50 and 51 under the feed-roller 8 and to and over the top of the table 52, to and round the positively-driven delivering-roller 53, and thence directly and backwardly to the tension-roller 49. The tension-roller 49 is journaled at its ends in the adjustable boxes 54, which latter are adjustably secured on the top sides of the main frames 1 and 2 by the bolts 55, which latter pass through the slots 56, formed in the top flanges of said frames 1 and 2, and the tension of the said apron 48 is adjusted by the tension-adjusting screws 57, which turn in the bearings formed in the arms 58, and said screws 57 are screwed into the sliding journal-boxes 54, and thus the said journal-boxes are traversed in either direction to either increase or decrease the tension of the apron 48 to the required degree. The lower guide-roller 50 and the upper guiding or receiving roller 51 are journaled at their ends in suitable bearings formed in the standards 11, and the said rollers are so situated that the apron 48 will be conducted from the forward tension-roller 49 in a horizontal plane under and clear of the roller 8 to the tension-roller 49.

A flour-box 59, having its top and bottom ends open and provided with a sieve 60, which extends along and across the interior of said flour-box at or near its open bottom end, is secured at its sides to the lugs 61, formed integral on the standards 11, and the said flour-box is provided for the purpose of flouring or dusting the apron 48 as it leaves or is paid off the tension-roller 49 to prepare the said apron to receive the dough as it is passed from and discharged by the reducing-rollers 8 and 9 to convey the said dough along the top of the table 52. An endless traversing apron 62 passes round the apron-roller 63, over the hopper-board 12, round the master-roller 8, and backwardly over the tension-roller 64, situated under the hopper-board 12, to the forward roller 63. The tension-roller 64 is journaled at its ends in the depending journals or hangers 65, which latter are adjustably secured to the sides 30 of the hopper-board 12. (See Figs. 1 and 3.)

A flour-box 66, having its top and bottom sides open and provided with a sieve 67, is secured at its ends to the sides 30 of the hopper-board 12, so as to be situated directly above the apron-roller 63, and the said flour-box is provided for the purpose of dusting or flouring the apron 62. A brush $67^b$ is secured to the rear bottom side of the flour-box 66 and extends transversely across the traversing apron 62, and said brush is situated so as to contact with said traversing apron, and the said brush is provided for the purpose of uniformly and evenly spreading the flour-dust over the entire surface of said apron 62. The power-distributing driving-shafts 68 and 69 extend longitudinally of the machine and are journaled in their bearings 70 and 71, formed integral on the inner sides of the side frames 1 and 2, and said shafts are each driven to rotate simultaneously by two independent trains of gears, both of which are alike and drive their respective shafts at the same speed of rotation and consist of the spur-gears 72, keyed on that portion of the necks 73 on each end of the roller 8 and between the latter and the end journals thereof, and the said gears 72 mesh with the idler-gears 74, which latter are adapted to turn on the studs 75, secured to each of the side standards 11 and in position on the inside thereof so that the idlers 74 on shaft 75 mesh with the spur-gears 76, securely keyed on shaft 77, which latter shaft is journaled in suitable bearings 78, formed in the side or main frames 1 and 2.

Adjacent to the spur-gears 76 are the bevel-gears 79, which are also securely keyed on said shaft 77 to turn therewith and are adapted to mesh with the bevel-gears 80, securely keyed on the ends of the power-distributing or driving shafts 68 and 69 to rotate the latter shafts.

The next process the dough has to undergo after leaving the reducing-rollers 8 and 9 is the folding process by which the flat ribbon of dough is folded or rolled into a round or cylindrical roll of uniform diameter and density. This I accomplish by means of the endless cross or folding apron 81, the proper speed of which is adjusted relatively to the speed of the traversing apron 48, and the said apron 81 extends transversely round and over the longitudinally-extending traversing apron 48, and the said apron 81 extends over the cross or folding apron roller 82, under the roller 83, the intermediate diagonally-extending roller 84, and the roller 85, thence over the upper roller 86 and round the lower tension or adjusting roller 87, back to the roller 82. The roller 82 has its end journals 91 prolonged to fit and to turn in the bearings 88, formed integral on the free ends of the brackets 89, and the latter brackets are adjustably secured to the brackets 90 to be moved in a vertical direction, and the supporting-brackets 90 are secured to the top of the frame 1 to be adjusted in a horizontal direction, and thus by moving either of the brackets 90 transversely with the side frames the angularity of the cross or folding apron 81, with the traversing apron 48, may be adjusted when so required.

The roller 83 has its end journals 92 adapted to turn in its journal-bearings 93, which latter are removably secured to the cross-apron roller-supporting arms 94 and 95. The diagonally-extending roller 84 has its end journals 96 adapted to turn in the bearings 97 and 98, which latter are removably secured to the cross-apron-supporting arms 94 and 95. The apron-roller 85 has its end journals 99 journaled in the journal-bearings 100, similar to those of the roller 83. The end apron-roller 86 has its end journals 101 journaled in suitable bearings formed in the arms 94 and 95 at or near the free ends thereof. The lower or tension roller 87 has its end journals 102 journaled in suitable journal-bearings formed near the swinging ends of the swinging or radius arms 103. The upper apron-supporting arms 94 and 95 and the lower radius-arms 103 are pivoted at their pivotal ends 94ᵖ, 95ᵖ, and 103ᵖ on the end journals 91 of the roller 82 between the said roller and its bearings 88 to swing thereon, and the forward free ends of said arms are adjustably secured and supported as hereinafter set forth. The tension-bars 104 are pivotally connected at their bottom ends to the swinging ends of the radius-arms 103 by the pins 105, and the top threaded ends of said bars 104 extend through the eyes or bores of the bosses 106, formed integral on the top bars 94 and 95, and on the threaded ends of said bars are situated the bottom adjusting-nuts 107, which bear against the lower sides of the bosses 106. The clamping or jam nuts 108 are situated on the said tension-bars above the bosses 106 and the same are provided for the purpose of securely clamping the tension-bar 104 to the arms 94 and 95 to prevent any undue vibration of the tension-roller 87. On the extreme ends of the arms 94 and 95 are formed the bosses 109, through the bores of which the anchor-rods 110 pass, and these latter are pivoted at their bottom ends to the eyebolts 111, secured to the side frame 2 by pins 112, and said anchor-rods 110 are threaded at their top ends to receive the lower adjusting-nuts 113 and the upper adjusting-nuts 114 and the adjusting nut-washers 115. A coil-spring 116 surrounds the anchor-rods 110 between the adjusting nut-washers 115 and the bosses 109, and the said springs are provided for the purpose of forming a yielding resistance against the upward movement of the bars 94 and 95 which might be caused by an uneven or enlarged portion of the dough passing through and under the folding-apron 81, thus forming the rollers 83, 84, and 85 upwardly. Motion is imparted to the folding-apron 81 and its rollers from the power-distributing shaft 68 by means of a train of gears consisting of a drive spur-gear 117, keyed or otherwise secured on said shaft 68, which gear meshes with the gear-wheel 118, keyed on the first joint or section 119 of the universal-jointed shaft. A gear-wheel 120 is keyed on the second or end section 121 of said universal shaft, and the said driving-gear meshes with the driven gear 122, keyed or otherwise secured on one of the journals 91 of the roller 82. The universal shaft by which the gear-wheel 118 is connected to the gear-wheel 120 to turn therewith is composed of the end sections 119 and 121 and an intermediate section 123, which latter section is connected to said end sections by suitable universal joints 124, which may be of any approved form of construction. The first section 119 of the universal shaft is journaled in the bearing-bracket 125, which is adjustably secured to the supporting-standards 126 by the securing-bolts 127, and the latter standard 126 is secured to the top side of the main side frame 2 by the securing-bolts 128 to be adjustable transversely with the frame, and thus as the bearings 88 are moved upwardly and downwardly or transversely with the machine to move the apron-roller 82 into any new position the bearing 125 and its supporting-standard 126 may also be adjusted when so required to secure the proper and free working of the sections 119 and 121 of the universal shaft. The second section 121 of the universal shaft 123 is journaled in the bearing 121ᵇ, formed integral on the bracket 89, and said shaft is secured in position therein by the fixed collar 121ᶜ.

The second cross or centering apron mechanism is somewhat similar in construction to that of the folding-apron mechanism, and its function is to transfer the folded or rolled dough from the edge of the main or traversing apron 48 to the center thereof to guide and direct the dough thus rolled into the die-rollers, hereinafter set forth.

The second cross or centering apron 129 traverses in a direction opposite to the apron 81 and extends transversely around and over the longitudinally-extending traversing apron 48, and the said apron 129 extends over the first apron-roller 130, under the parallel rollers 131 and 132, then over the adjustable tension-roller 133 and over the outer roller 134 and downwardly to and round the lower tension-roller 135, and thence back to the roller 130. The roller 130 has its end journals 136 prolonged to fit and to turn in the bearings 137, formed integral on the free ends of the brackets 138, and the latter brackets are adjustably secured to the brackets 139 to be moved, when such is necessary, in a vertical direction, and the supporting-brackets 139 are secured to the top of the frame 2 to be adjusted in a horizontal and transverse direction with the machine, and thus by moving either of the said supporting-brackets 139 the said centering-apron 129 may be adjusted to be either at right angles with the main traversing apron 48 or to an angle therewith, according as to the nature and the requirements of the dough to be worked. The parallel centering-rollers 131 and 132 have their end journals 140 adapted to turn in their journal-bearings 140ᵇ, which latter are removably and adjustably secured to the cross-apron-roller-supporting arms 141. (See Figs. 7 and 9.)

The top tension-roller 133 has its end journals 142 adapted to turn in the bearings 143, which are adjustably and removably secured to the supporting-arms 141. The fixed end apron-roller 134 has its end journals 144 fitted in and adapted to turn in suitable journal-bearings formed at or near the ends of the supporting-arms 141. The lower tension-roller 135 has its end journals 145 journaled in suitable journal-bearings formed in the lower swinging or radius arms 146. The upper apron-supporting arms 141 and the lower radius-arms 146 are pivoted at their pivotal ends 141ᵖ and 146ᵖ on the end journals 136 of the roller 130 between said roller and the bearings 137 to swing thereon, and the forward free ends of said arms are adjustably secured and supported by means similar to that used in connection with the folding or rolling apron mechanism, and which means I will now proceed to describe. The tension-bars 147 are pivotally connected at their bottom ends to the swinging ends of the radius-arms 146 by the pins 148, and the top threaded ends of said bars 147 extend through the bores of the bosses 149, formed integral on the top supporting-arms 141, and on the threaded ends of said bars are screwed the bottom adjusting-nuts 150, which bear against the bottom sides of the bosses 149. The clamping or jam nuts 151 are situated on the said tension-bars 147 above the arms 146, and the same are provided for the purpose of securely clamping the tension-bars 147 to the swinging arms 146 to prevent any undue vibration of the rollers supported by said arms 141. On the extreme ends of the upper arms 141 are formed the bosses 152, through the bores of which the anchor-rods 153 pass, and these latter are pivoted at their bottom ends to the eyebolts 154, secured to the side frame 1, and said anchor-rods 153 are threaded at their top ends to receive the lower adjusting-nuts 154ᵇ and the upper adjusting-nuts 155. A coil-spring 156 surrounds the anchor-rods 153 between the adjusting-nut washers 157 and the bosses 152, and the said spring is provided for the purpose of forming a yielding bearing to resist the upward movement of the bars 141.

Motion is imparted to the centering-apron 129 and its rollers by the longitudinally-extending drive or power-distributing shaft 69 by means of a train of gears somewhat similar to the drive-gears of the folding-apron mechanism, and the said gears consist of a drive spur-gear 158, keyed or otherwise secured on the shaft 69, which gear meshes with the gear-wheel 159, keyed or otherwise secured on the first section 160 of the universal shaft. A gear-wheel 161 is keyed on the second section 162 of the said universal shaft, and the said drive-gear 161 meshes with the gear 163, keyed or otherwise secured on one of the journals 136 of the roller 130. The universal shaft by which the gear-wheel 159 is connected to the gear-wheel 161 to turn therewith is composed of the end section 160 and the end section 162 and an intermediate section 164, which latter section is connected to said end sections by suitable universal joints or couplings 165, which latter may be of any approved form of construction. The first section 160 of the universal shaft is journaled in the bearing-bracket 166, which is adjustably secured to the top of the main side frame 2 by suitable securing-bolts 167 to be adjustable transversely with the frame and the machine. The second section 162 of said universal shaft is journaled in the bearings 168, formed integral on the bearing-bracket 138, and the said section 162 is maintained in position in said bearing by its retaining-collar 169.

I do not confine myself to this particular form of construction and arrangement of mechanism for folding, rolling, and centering the dough on the main traversing apron after being delivered from the reducing-rollers preparatory to delivering the same to the die-rollers and other mechanism for forming and working the dough, as other forms and arrangements of mechanism may be employed to perform this function equally well—as, for instance, the mechanism illustrated in Figs. 21, 22, and 23, (see Sheet 9)—and which may be substituted for the above-described apron mechanism, and which latter mechanism I will now proceed to describe.

A diagonally-extending folding-roller 170 has its end journals 171 journaled in the bearings 172 and the adjustable bearings 173 secured to the main side frames 1 and 2. A bevel-gear 174 is keyed on the shaft 68 and meshes with the bevel-gear 175, keyed or otherwise secured on the shaft 176, and on the upper end of said shaft 176, above the bearing 177 thereof, is keyed the bevel-gear 178, which meshes with the bevel-gear 179, keyed on the neck of the journal 171 of the roller 170 to rotate the latter in the direction indicated by the arrow—that is, in a direction opposed to the movement of the traversing apron 48. A series of helically-extending blades 180, preferably of rubber or other pliable and elastic material, surrounds the roller 170, and the said blades are provided to lift and to turn over the sliver or ribbon of dough as it is passed under said roller to fold and to turn the dough over upon itself to form a continuous roll. A rotary cleaning or stripping brush 181 has its end journals 182 journaled in the bearings 183, formed in the top ends of the roller-bearings 172 and 173, and the said brush is rotated by means of the spur-gear 184, keyed on the journal 171 of the folding-roller 170, which wheel meshes with the gear-wheel 185, which latter meshes with the gear-wheel 185ᵃ, keyed on the journal 182 of the rotating brush 181, and the said brush is so situated relatively to the said folding-roller 170 and in parallel relation thereto that in the event of the dough adhering to any of the helical blades 180 said rotary brush will strip or clean said blades and prevent the dough from being carried by said blades round the roller 170, and thereby causing the machine to be inoperative and requiring its being stopped, and thereby wasting the dough. Another means whereby the dough after being folded or rolled by the folding-roller 170 may be moved centrally on the traversing apron 48 and conducted directly to and into the die-rollers 194 and 195 consists of the idler-rollers 186, (see Sheet 8,) each of which rollers is arranged in a row and has its axis slightly inclined to the plane of the apron 48, and said rollers have their bottom flanged portions 189 beveled to contact with the surface of the traversing apron 48 to impart a rotary motion thereto gently and gradually to move the dough to the center of the apron without resistance to said dough, which would break the skin thereof or tear the dough. The rollers 186 are each journaled on the studs 188, which latter are firmly secured to the supporting-arm 189ᵃ. The supporting-arm 189ᵃ is pivoted at one end to the vertically-extending stud 190, which latter is secured to the main side frame 2, and the free or swinging end of said arm 189ᵃ is held in position by the securing-bar 191, which is pivoted to the free end of said arm 189ᵃ at one end and at its opposite end is adjustably secured to the stud 192, which latter is secured to the frame 2 by a binding-nut 193.

I will now proceed to describe the die-rollers, whose function it is to equalize the thickness and density of the dough. The side die-rollers 194 and the top die-rollers 195 have their peripheries concaved, so that when combined, as shown particularly in Fig. 10, they form approximately a complete circle. The side die-rollers 194 have their enlarged bottom edges beveled to contact with the traversing apron 48 to assist the rotation of said rollers, and said rollers 194 are mounted to turn on the fixed studs 196, secured to the bearings 197, formed integral on the cross supporting-beam 198. The top edges of the side rollers 194 are preferably provided with the bevel-toothed surfaces 199, which teeth mesh with the teeth 200, formed on the beveled edges of the top die-roller 195 to be positively driven thereby. The die-roller 195 is secured on its shaft 200ˢ between the journal-bearings 197 to turn with said shaft, and said shaft 200ˢ is prolonged to fit and to turn in the bearing 201, formed on the end of the supporting-standard 202. The supporting-standards 202 and 203 have their base ends 204 securely bolted to the top of the frames 1 and 2, and to their top end bearing-faces are fitted and securely bolted the ends of the supporting-beam 198, by which means the entire weight and resistance of all the die-rollers 194 and 195 are sustained. A bevel-gear 206, keyed on the shaft 68, meshes with the bevel-gear 207, keyed on the lower end of the vertical shaft 208 to turn the latter, and a bevel-gear 209, keyed on the upper end of said vertical shaft, meshes with the bevel-gear 210, keyed on the die-roller shaft 200ˢ to positively rotate said die-rollers 194 and 195, and the said vertical shaft 208 is journaled in the bearings 211, formed integral on the supporting-standards 202. When it is required to change the form of the dough from a round section to that of a rectangular section as it leaves the folding-rollers 83 and 84 and their folding-apron 81, I employ plain cylindrical rollers for that purpose and situate them relatively to each other so that their axes will be at right angles to each other, and the said rollers are substituted for and driven as the rollers 194 and 195. It is essential that the peripheral speed of all the die-rollers be equal to each other and equal to the lineal speed of the traversing apron 48 in order that the soft pliable dough be not forced or stretched. The dough having been passed through the die-rollers 94 and 95 is now carried under the flattening-roller 212, the function of which roller is to flatten out and to reduce the thickness of the dough as the same is being traversed under it or carried under it by the traversing apron 48. The roller 212 extends transversely across and above the apron 48 and is supported at the proper distance above said apron by the standards 213 and 214 in the bearings 213ᵃ, on which the journals 214ᵃ of the flattening-roller 212 turn. The flattening-roller 212 is rotated at a peripheral speed equal to the lineal velocity of the traversing apron 48 by the bevel gear-wheels 215, keyed on the shaft 68, which gear-wheels mesh with the bevel gear-wheel 216, keyed on the bottom end of the vertical shaft 217 to turn the latter, and a bevel-gear 218, keyed on the top end of said vertical shaft 217, adapted to turn in the bearings 217ᵃ, formed integral with the standard 214, meshes with the bevel-gear 219, keyed on the neck of the journal 212ᵃ to rotate the latter gear 219 to impart the proper peripheral speed to the flattening-roller 212—that is, a speed equal to the lineal speed of the traversing apron 48.

A flour-box 220, having its top and bottom sides open and provided with a sieve 221, which extends entirely along and across the interior of said flour-box, at or near the open bottom side thereof, is provided for the purpose of equally distributing the flour-dust over the surface of the rollers 194 and 195 to be dusted or floured, and the said flour-box 220 is supported with its open bottom side directly over the die-rollers 194 and 195 and the flattening-roller 212 by its supporting-standards 222, which latter are secured to the supporting-standards 213 and 214 and the standards 202 and 203.

The next process to which the dough is subjected is the trimming, evening, or paralleling of the edges thereof. This is accomplished by the trimming-disks 223, which I will now proceed to describe. The said trimming-disks 223 have their peripheral trimming edges rounded or of a semicircular form and said edges are maintained at all times in close contact with the traversing apron 48, and the object of such a form of trimming edge is to crush the projecting uneven edges of the dough from the main body thereof rather than to cut or sever the dough by means of a knife-edge, which latter method has been found in practice to be impractical and would expose the wet severed surface to the rolls and the traversing apron, thereby causing the dough to adhere thereto, and such edged disks would be further impractical, as they would sever or cut the traversing apron. The trimming-disks 223 are removably and adjustably mounted on the shaft 224 by any suitable means, as the set-screws 225, to be set at pleasure at any required distance apart, and the said shaft 224 is journaled at its ends in the bearings 226, formed in the standards 227 and 228, which latter are securely bolted to the side frames 1 and 2. The trimming-disks 223 are rotated by the driving-gear train, (see Fig. 25,) consisting of the bevel-gear $229^g$, meshing with the bevel-gear $228^g$, keyed on the vertical shaft $226^g$, and the latter shaft $226^g$ is journaled in the bearings $227^g$, formed integral on the standard 227. A bevel-gear $224^g$, keyed on the top end of the shaft $226^g$, meshes with the bevel-gear $223^g$, keyed on the disk-shaft 224 to turn the latter. The dough thus worked and equalized is prepared to be divided into parts of equal size and weight, and the dividing-knife 229 and the mechanism whereby the latter is operated I will now proceed to describe. The dividing-knife 229 is preferably constructed with a rounded blunted dividing edge, and this form of dividing edge is provided for the purpose of dividing the dough by compression without cutting or severing it, as would be the case were the knife provided with a sharp cutting edge, and by this method of dividing the dough the outer skin of the latter is preserved whole and without break or crack, and the said knife has its outer reduced ends 230 extended beyond the main side frames 1 and 2, and to the said reduced ends are secured the end bosses 231 by suitable bolts or other securing means, and the said bosses are drilled to receive the reduced ends of the vertically-extending reciprocating rods 232, to which the ends of the said knife are secured by suitable nuts screwed on the threaded ends of the said rods 232 above and below said end bosses 231 of said dividing-knife. The vertically-extending reciprocating rods 232 are adapted to reciprocate in the bearings 233, formed integral with the guide-bars 234, by means of which latter the bottom cross-head ends 235 of said rods 232 are guided and steadied throughout their paths. The guide-bars 234 extend vertically downwardly, with the cross-head bearing-faces of said bars parallel to each other, and between which bearing-faces the cross-heads 235 are fitted to freely slide and reciprocate, and the said guide-bars 234 are provided with the fitting strips or feet 236, formed integral on the top ends thereof, which feet are securely bolted to the outer sides of the top rails of the side frames 1 and 2 to securely maintain said guide-bars in their true vertical positions. The cam-rollers 237 are mounted on the cam-roller pins $237^b$ to turn thereon, and the said pins have their ends reduced and threaded to be firmly secured in the bore of the cross-head 235. The cam-disks 238, situated at the opposite outer sides of the machine, are each provided with the cam-grooves 239, both of which grooves are alike and similar in form, which are adapted to receive the cam-rollers 237, and the said cam-disks are permanently secured in position relatively to each other on the extreme ends of their common driving-shaft 240, that the said cam-grooves 239 will operate to reciprocate the vertically-reciprocating rods 232 simultaneously and in the same direction. The cam-shaft 240 is journaled in suitable bearings formed in the side frames 1 and 2. A gear-wheel 241 is keyed or otherwise firmly secured on the cam-shaft 240, and the said gear-wheel meshes with the gear-pinion 242, secured on the shaft 243. The shaft 243 is journaled in suitable bearings 244, formed on the side frames 1 and 2, and a gear-wheel 245, keyed on the shaft 243, meshes with the pinion 246, secured on the shaft 247 to turn therewith. On the outer projecting ends of the intermediate shaft 243 are keyed the fly-wheels 248, which are provided for the purpose of steadying the movement of the said cam-shaft 240, which would otherwise be irregular owing to the unequal and intermittent distribution of the forces due to the reciprocating knife. It is necessary that the speed of the reciprocating knife be adjustable, so as to be varied at pleasure in order that the lengths or sizes of the divisions of the dough may be either increased or diminished, as when it is required to make a larger or a smaller loaf of bread, and for this reason I provide the variable-speed mechanism, which I will now proceed to describe. On the shaft 247 are mounted the interlocking or double cones 249, which are adapted to slide longitudinally thereon and to turn therewith, and on the shaft 250 are mounted the interlocking or double cones 251, which are also adapted to slide longitudinally on said shaft and to turn therewith. Integral on each of the cones 249 and 251 are formed the clutch-collars 252, which are provided with suitable peripheral grooves 253, which are adapted to receive the shifting pins 254, secured on the ends of the shifting lever 255. The shifting lever 255 is pivoted on the fulcrum-pin 256, secured on the supporting-bracket 257, which latter is firmly bolted to the bottom rail of the side frame 1 and in position thereon to maintain the shifting pins 254 in the grooves 253. A shifting handle 258, by means of which the said shifting lever is manipulated, is formed centrally on and integral with the lever 255. A flexible belt 259 surrounds the speed-cones 249 and 251 to transmit motion from the latter to the former. A gear-wheel 260, keyed or otherwise secured to the shaft 250, meshes with the gear-wheel 261, keyed on the shaft 262, and the latter shaft is adapted to turn in its bearings 263, formed on the side frames 1 and 2. On one of the prolonged ends of the shaft 262 is keyed the spur-wheel 264, which meshes with the spur-wheel 265, keyed on the prolonged end journal 73 of the master-roller 8. The usual belt-driving pulleys by which the machine is driven may be placed on the prolonged outer end of the shaft 262.

A roller 266 extends transversely with and beneath the apron 48, with which it contacts, and the said roller is situated directly under the dividing-knife 229 and has its end journals 267 journaled in the standard-bearings 268, which latter are secured to the top rails of the side frames 1 and 2, and the said roller 266 is free to rotate and be driven by the apron 48, with which it contacts. The standards 268 have their bosses 269 formed integral on their top extended ends, and the said bosses are drilled to receive the scraper-supporting rods or bars 270 and 271. Spring-steel scraping-fingers 272 are adjustably secured at their top ends to the scraper-bar 270, and the said scraping-fingers are arranged to have their side edges contact with the sides of the trimming-disks 223 to scrape off any small particles of dough that might adhere to said disks. A scraper 273 is secured at one end to the scraper-bar 271, and the said scraper has the edge of its free end contacting with the forward face of the dividing-knife 229 to clear the latter. A flour-box 274 has its top and bottom sides open and provided with a sieve 275, which extends entirely across and along the interior of said flour-box, at or near the bottom open side thereof, and the said flour-box is provided for the purpose of dusting or flouring the dividing-knife 229 to prevent the dough adhering to it. The said flour-box 274 is supported in position over said dividing-knife 229 by its supporting-standards 276, which are secured at their bottom ends to the supporting-beam 277 of the dough-turning mechanism.

In certain cases, as when the dough is conducted to the dividing-knife 229 in a continuous roll to be divided into long rolls preparatory to being further worked and formed to round elongated loaves, such as Vienna loaves, it is necessary to turn such divided lengths of dough into position transversely with the traversing apron 48 to be rolled and further worked and finished, and with this object in view I provide a turning mechanism for turning the dough, which mechanism I will now proceed to describe.

The turning-blades 278 may be either constructed of wood or pliable spring-steel and are adjustably and removably secured at their top edges to the cross-arm 279 of the vertically-extending turning spindle 280 and in position thereon to provide a space, which may be either extended or contracted, through which the divided portions of the dough may pass freely. The bottom edges of the blades 278 touch or almost touch the traversing apron 48 when the spindle 280 is in normal position—that is, in its lower position. The turning spindle 280 is adapted to turn in its bearing 281, formed integral on the supporting-beam 277, which latter beam extends transversely with the machine and above the traversing apron 48, and said beam has its ends securely bolted to the top ends of the supporting-standards 282, which latter are securely bolted to the top rails of the side frames 1 and 2. A gear-wheel 283 is secured by a key or other suitable means to the vertically-extending spindle 280 to turn therewith and in such a manner that the said spindle is free to slide longitudinally in the bore of the said gear 283, and the latter gear-wheel is situated on said spindle above the bearing 281 and is adapted to mesh with the toothed reciprocating rack 284, which latter is maintained in position on the top side of the supporting-beam 277 by the guiding-fingers 285, which extend over the top and sides of said rack, and said fingers are secured to said beam in such position thereon to maintain the teeth of said rack in gear with the gear-wheel 283 throughout the stroke of the former when moving in either a forward or backward direction. One end of the rack 284 is provided with a forked end 284$^f$, between which is fitted the end of the connecting-rod 286, and the latter is hinged thereto by the pin 287, and the opposite end of said connecting-rod is hinged to the shorter arm 288 of the lever 289, and the said lever is pivoted on the fulcrum-stand 290, secured on the top side of the beam 277. A pitman 291 is pivoted at its top end to the end of the longer lever-arm 289 and extended downwardly to the adjustable crank-pin 292, to which it is connected and pivotally secured thereon by a suitable washer 293 and retaining-screw 294. The crank-pin 292 is permanently secured to the traversing head or slide-block 295, the dovetail sides of which latter are adapted accurately to fit and to slide between the guide-strips 297, formed on the outer faces of the adjacent disk 238. The slide-block 295 is drilled and threaded to receive the traversing screw 298, which latter is screwed therein, and the opposite end of said screw is turned truly to fit the bore of the fixed block 299 freely to turn therein. The free end of the said screw 298 has a square head or end formed thereon, to which a key or spanner may be applied to turn said traversing screw when it is required to increase or decrease the eccentricity of the crank-pin 292 to increase or decrease the travel or stroke of the traversing or reciprocating rack 284. The turning-blades 278 have not only a motion of rotation in right and left hand directions, but also a motion of translation in a vertical direction, which latter motion must be imparted to said blades at that part of their rotation when the divided portion of dough has been turned transversely with the apron to raise said blades 278 clear of the said piece of dough and permit said dough to pass freely under said blades. With this object in view I provide the enlarged collar 299, which is securely keyed or otherwise permanently secured on the vertically-extending spindle 280 to turn therewith, and a cam-groove 300 is formed in the peripheral surface of said collar and is adapted to receive the fixed pin 301. The fixed pin 301 is firmly secured in the boss 302, formed integral on the end of the vertically-extending arm 303, which latter is formed integral on the supporting-beam 277, and owing to the peculiar form and the position of the cam-groove 300 relatively to the turning-blades 278 said blades after having made a quarter-turn will ascend.

The secondary or delivering apron 304 is arranged to travel at a much greater velocity than the main traversing apron 48, and the said traversing apron 304 surrounds the forward apron-roller 305 and extends over the forming-table 306, which latter table is suitably supported in position relatively to said apron 304 by its supporting-standards 307, which are securely bolted on the frames 1 and 2, and the said delivering-apron passes over the tension or delivering roller 308, thence under the forming-table 306, back to the forward roller 305. The forming-table 306 may have its top surface plane, convex, or concave, according as it is required to form the dough or mold the divided portions of dough into a cylindrical roll of uniform diameter throughout its length, thick at the middle portion or thin at the ends. The apron-roller 305 has its end journal 309 adapted to turn freely in suitable bearings 305$^d$, formed in the standards 309$^b$, in which standard suitable bearings are formed, in which the journals of the apron-roller 53 also turn, and the delivering-apron roller 308 has its end journals 310 journaled in the adjustable bearings 311, which are adjustably secured to the top of the side frames 1 and 2.

The apron drive-roller 53 has its end journals 312 journaled in the bearings 313, formed in the standards 309$^b$, and the said apron drive-roller 53 derives its motion from the longitudinally-extending side shaft 68 through a train of gears consisting of a bevel-gear 314, keyed on one of the end journals 312 of the apron-roller 53, and said bevel-gear 314 meshes with the bevel-gear 315, keyed on the top end of the vertically-extending shaft 316 to turn with the latter. The vertical shaft 316 is adapted to turn in its bearings 317, formed integral on the side of one of the standards 309$^b$, and on the lower projecting end of said vertical shaft 316 is keyed the bevel-gear 318, which latter is adapted to mesh with the bevel-gear 319, keyed on the longitudinally-extending side shaft 68, and by this gear the proper speed of rotation is imparted to said apron-roller 53.

A conducting-roller 320 rotates in the same direction as the top surface of the delivering-apron 304 and with the same superficial speed, and the said roller conducts the divided portions of the dough to the working roller 321 as said divided portions of dough are discharged by the apron 48 to and upon the delivering-apron 304. The working roller 321 is rotated at a very slow speed and in a direction opposed to the direction of travel of the apron 304, and the function of said roller 321 is to further work the divided portions of dough, to remove all breaks from the surfaces or skin thereof, and to prepare the said divided portions of dough to be further operated or worked upon by the finishing and forming or shaping rollers, hereinafter more particularly referred to.

The conducting-roller 320 and the working roller 321 have their end journals 322 and 323 working in their journal-bearings 324 and 325 of the standards 326, which latter are securely bolted on the top rails of the side frames 1 and 2. A spur-pinion 327, keyed on the neck of one of the journals 322, meshes with the spur-gear 328, keyed on the neck of one of the journals 323, to drive the working roller 321 in a direction opposed to the apron 48 and at a speed of rotation much lower than that of the roller 320. A bevel-gear 329 is keyed on the neck of the journal 323, and the said bevel-gear meshes with the bevel-gear 330, keyed on the upper end of the vertically-extending shaft 331. The vertically-extending shaft 331 is journaled in the bearings 332, formed integral on the bearing-standards 326, and on the lower end of said vertical shaft is keyed the bevel-gear 333, which meshes with the bevel-gear 334, keyed on the shaft 68, and by such train of gearing rotative motion of the proper speed is imparted to said rollers 320 and 321. A flour-box 335, similar to the flour-boxes previously described, is supported over the rollers 320 and 321 and is provided for the purpose of dusting or flouring said rollers in the manner and for the purpose previously described in connection with the other flour-boxes.

The finishing-rollers 335', 336, and 337 are of equal diameters and similar in form of profile, whether they be straight, cylindrical, concave, or convex, according to and dependent on the form of the loaves to be passed under them to be finished. The finishing-rollers 335', 336, and 337 are arranged in parallel relation to each other and have their journals 338, 339, and 340 working in bearings formed in the supporting-arms 342 and 343, which latter arms are pivotally mounted on the end journals 310 at their rear pivotal ends 344, and said arms are provided with the segmental depending arms 345 at their forward ends, which latter are slotted to receive the securing-screws 346, by which said arms are secured to the side frames 1 and 2 to maintain said supporting-arms 342 in position to hold the rollers 335', 336, and 337 at their proper heights above the table 306. The finishing-rollers 335', 336, and 337 derive their motion from the longitudinally-extending driving-shaft 69 through a train of gears consisting of a bevel-gear 347, keyed on said shaft 69 and meshing with the bevel-gear 348, which is adapted to turn freely on the fixed stud 349, secured on the side frame 2. A spur-gear 350 is secured to said bevel-gear 348 and on the same center to turn freely therewith, and the said spur-gear 350 meshes with the spur-gear 351, keyed on one end of the journal-shaft 310 of the apron-roller 308 to rotate the latter. The spur-gear 351 meshes with the spur-gear 352, and the latter spur-gear is loose and adapted to freely turn on the projecting end of the shaft 340, and to the said spur-gear 352 is secured centrally therewith the bevel-gear 353, which latter turns therewith. The bevel-gear 353 meshes with the bevel-gear 354, keyed on the end of the counter-shaft 355, and said counter-shaft 355 is adapted to turn in the journal-bearings 356, secured to the outer side of the supporting-arm 343. A sleeve 357 is mounted on the shaft 355 to turn therewith and to slide longitudinally thereon, and on each of the ends of the said sleeve are secured the bevel-gears 358, which are of like diameter and pitch of teeth, which bevel-gears are adapted to be moved alternately into gear with the driven bevel-gear 359, keyed or otherwise secured on the prolonged outer end of the journal 338 of the finishing-roller 335', and the said change-gears 358 are provided for the purpose of rapidly changing the motion of the finishing-rollers and the apron surrounding them from a motion in the same direction as the apron 304 to a motion in the opposite direction—that is, to drive the apron 360 of the finishing-rollers 335', 336, and 337 in a direction opposed to that of the apron 304, and vice versa, as the nature of the case may require—and the speed of the said finishing-rollers and their surrounding apron 360 and the direction in which they are run is determined by and dependent upon the nature of the dough and the amount of work to which the dough must be subjected to attain the desired result and to mold the dough into the required form.

A flour-box 360$^f$, provided with the sieve 360$^s$, is supported above the apron 360 by suitable supporting-standards 360$^L$, which latter are secured to the supporting-arms 342 and 343 of the finishing-rollers 335, 336, and 337. A groove 361 is formed intermediate the ends of the sleeve 357 and a shifting lever 362 fulcrumed on a fixed pin 363, which latter is secured to the finishing-roller supporting-arm 343, and the said lever has its lower depending end 364 adapted to engage the groove 361, and the said shifting lever is provided for the purpose of moving said sleeve 357 longitudinally on the shaft 355 to cause either of the bevel-gears 358 to engage the bevel-gear 359 on the finishing-roller 335'.

In addition to the finishing or molding mechanism above described I provide a mechanism whereby the divided portions of the dough are formed or molded into spheres for another common form of loaf.

An inner forming-cone 364 is mounted on the vertically-inclined shaft 365 to turn therewith, and the said shaft is adapted to turn in the bearings 366, formed integral on the supporting-bracket 367. The supporting-bracket is composed of the side portions 367, both of which are alike, and the transversely-extending rail portions 368, 369, and 370, and the said supporting-bracket has its inner bearing-faces 372 formed to fit the curvature of the ends of the side frames 1 and 2, to which said bearing-faces are securely bolted. Completely surrounding and inclosing the inner forming-cone 364 is the outer forming-cone 373, which has its top and bottom ends open, and said cone 373 is provided with the bearing and guiding rollers 374, which are mounted on the fixed studs 375, preferably four in number, which studs are firmly secured to the outer peripheral opposite sides of said cone intermediate the top and bottom ends thereof, and the said bearing and guiding rollers 374 are adapted to run in the annular trackways 376 within the flanges 377 thereof, which latter are provided for the purpose of maintaining said rollers on said track, and the said track is supported concentrically with the common axis of the interior and exterior cones 364 and 373 by means of the supporting-arms 378, which latter are securely bolted to the ends of the side frames 1 and 2. A coned ring or annulus 379 surrounds the outer cone 373 at the base thereof and integral therewith, and on the periphery thereof are formed the gear-teeth 380, which teeth mesh with the teeth of the gear-wheel 381, keyed on the top end of the vertically-inclined shaft 382 to turn therewith. The shaft 382 is journaled in the bearings 383, formed integral on the supporting-bracket 367, and on the bottom end of said shaft is keyed the bevel-gear 384, which meshes with the driving bevel-gear 385, keyed on the horizontal shaft 386, and by the said train of gearing motion is imparted to the outer forming-cone 373.

The horizontal driving-shaft 386 is journaled in suitable bearings 387, formed integral on the central portions of the cross-rails 388, and the said rails are secured to the supporting-brackets 367 and to the side frames 1 and 2 at proper distances apart to securely and rigidly hold said shaft 386 in position. A bevel-gear 389, keyed on the shaft 240 to turn therewith, meshes with the bevel-gear 390, keyed on the forward end of said shaft 386 to turn the latter shaft, and a bevel-gear 391 is keyed on the rear end of said shaft and meshes with the bevel-gear 392, keyed on the shaft 365 to turn the latter shaft and the inner shaping-cone 364, and thus the inner and the outer shaping-cones 364 and 373 are driven positively in the same direction and at different speeds. When it is desired that the direction of rotation of the outer shaping-cone 373 be reversed, a bevel-gear 393 (shown in dotted lines) is secured on the shaft 386 in the position shown to drive the gear 384, and the bevel-gear 385 is moved along the shaft 386 out of gear, which change is readily made.

I will now proceed to describe the practice of my invention. The dough is first prepared and rolled into the proper state by a special rolling-machine or breaker. The dough thus prepared is placed on the feed-apron 62 of the hopper table or board 12 and is carried under the equalizing-rollers 28, 27, and 26 to be gradually reduced before being delivered to the reducing-rollers 8 and 9, and thus preventing the latter rollers becoming gorged and choked. The dough in passing between the reducing-rollers 8 and 9 is reduced to a thin continuous ribbon, which is delivered upon the main traversing apron 48, and the speed of the latter being equal to the peripheral speed of the roller 8, or it may in some instances be slightly faster, is taken up as fast as delivered and carried to the first cross or folding apron 81, which latter apron folds or rolls the dough into a continuous roll or cylinder, and in thus forming and rolling said sliver or ribbon of dough the said roll or cylinder of dough is moved toward the outer edge of the apron 48. It is now necessary gradually to roll or turn the dough to return the same to a position central upon the apron 48 in order to direct said dough straight to and between the die-rollers 194 and 195. This transfer of the dough I accomplish by means of the second cross-apron or centering-apron 129, which traverses across the apron 48 in a direction opposed to the folding-apron 81—that is, in the direction indicated by the arrow $x$ (see Fig. 7)—so that when the dough contacts with the apron 129 it is rolled from the position $a$ to the position $b$—that is, to the center of the apron 48. The cylinder dough is now passed through the die-rollers 194 and 195 to be still further reduced and worked, and the dough thus worked is passed directly to the dividing-knife 229 to be divided into portions of equal weight or density and size. When it is required still further to work the dough before delivering the same to the dividing-knife 229—as, for instance, to prepare the dough for square loaves of bread—said dough after leaving said die-rollers 194 and 195 is passed under the flattening-roller 212 to be flattened out, after which the dough is passed between the trimming-disks 223 to reduce it to a uniform width, after which trimming operation the dough is passed to the dividing-knife 229 to be divided, as previously described.

When the machine is not required for use in making square loaves, the cylindrical roll of dough when divided into smaller rolls extends longitudinally of the traversing apron 48 and must be turned transversely with said apron before being further worked. This operation of turning is performed by the turning-blades 278, and the divided portions of dough are then delivered to and upon the secondary apron 304, which latter apron is driven at a more rapid speed than the apron 48 for the purpose of carrying the divided portions of dough away as they drop from the apron 48, and thereby cause a wide space to be formed between each successive divided portion or loaf, so that each individual portion of dough may be thoroughly worked and discharged from the machine before a second portion of dough is served to the apron 304. If it is desired, further, to roll the divided portions of dough to reduce their diameters and to extend their lengths, said portions of dough are further worked by the conducting-roller 320, which rotates in the same direction as the apron 304, and thence are passed under the roller 321, which rotates at a slow speed and in a direction opposed to that of the apron 304, which movement imparts a rotary or rolling motion to the rolls of dough, giving each individual roll of dough an individual initial velocity before subjecting them to a further working under the finishing and molding rollers 335', 336, and 337.

The finishing-rollers 335', 336, and 337 are driven in a direction opposed to the apron 304 when it is required to further work and roll the divisions of dough to mold them into the desired form, such as indicated in Figs. 22 and 23, and after thus working the portions of dough into form they are removed from the apron 304, either automatically or manually, and placed in a suitable oven to be baked.

If the dough is divided into very short rolls and it is necessary to form them into spheres, the said short cylindrical divisions are transferred from the knife 229 and passed directly to the revolving forming-cones 364 373, between which said short portions of dough are each rolled and molded into spheres. When such process is followed, the turning-blades 278, the conducting and working rollers 320 and 321, and the finishing-rollers 335, 336, and 337 are removed to permit the said divided portions of dough as they leave the dividing-knife 229 to pass uninterruptedly to the forming-cones 364 373.

It will of course be understood that the dough is conveyed to the forming-cones 364 and 373 through the medium of the apron 304, the loaves dropping over the discharge end of said apron into the open upper end of the cone 373.

Another means is provided by which the sliver of dough may be folded or rolled as it is discharged from the reducing-rollers 8 and 9. The series of rollers are arranged in parallel relation to each other and consist of the lower roller 400, the intermediate roller 401, and the upper roller 402, which rollers are arranged one above the other and in a vertical plane, which plane is inclined forwardly and toward the delivering sides of the reducing rollers 8 and 9, and the said rollers have their axes inclined at an angle of about forty-five degrees with the line of motion of the traversing apron 48, and the said rollers have their end journals 403, 404, and 405 journaled in suitable bearings formed on the supporting-standards 406 and 407. The said folding-rollers derive their motion from the shaft 68 by means of a train of gears, consisting of the bevel-gear 408, keyed on the shaft 68, which bevel-gear meshes with the bevel-gear 409, keyed on the lower end of the vertical shaft 410. The vertical shaft 410 is journaled in the bearings 411, secured to the inner side of the standard 407, and on the top end of said vertical shaft 410 is keyed the bevel-gear 412, which meshes with the bevel-gear 413, (shown in dotted line in Fig. 20,) keyed on the journal 403, and on the journal 403 is keyed the spur-gear 414, which meshes with the idler 415, which latter is adapted to turn on the fixed stud 416, and the said idler 415 meshes with the spur-gear 417, (shown in dotted lines,) keyed on the journal 404, and the latter spur-gear 417 meshes with the idler 418, adapted to turn on the fixed stud 419, and the latter idler 418 meshes with the spur-gear 420, keyed on the journal 405 of the top roller 402, and thus each of the rollers 400, 401, and 402 is rotated positively and simultaneously at the same speed and in the same direction of rotation.

Having thus fully described my invention, what I claim as new and useful, and desire to cover by Letters Patent of the United States therefor, is—

1. In a bread-making machine, the combination with a dough-receiving feed-hopper, and a pair of dough-reducing rollers situated at the delivering end of said feed-hopper, of a traversing feed-apron extending over the top surface of said feed-hopper and surrounding the bottom reducing-roller, an apron extending from said reducing-rollers to receive the dough therefrom, and means for folding the dough adjustably mounted across said apron to be presented at different angles thereto.

2. In a bread-making machine, the combination with a dough-receiving feed-hopper, and a pair of dough-reducing rollers situated at the delivering end of said feed-hopper, of a traversing feed-apron extending over the top surface of said feed-hopper and surrounding the bottom reducing-roller, suitable means for dusting said apron with flour, an apron extending from said reducing-rollers to receive the dough therefrom, and means for folding the dough adjustably mounted across said apron to be presented at different angles thereto.

3. In a bread-making machine, the combination with a dough-receiving feed-hopper, an apron-roller situated at the receiving end of said hopper, and a pair of dough-reducing rollers situated at the delivering end of said hopper, of a traversing apron surrounding said apron-roller and extending over said feed-hopper and surrounding the bottom roller of said reducing-rollers, means for continuously dusting said traversing feed-apron with flour, an apron extending from said reducing-rollers to receive the dough therefrom, and means for folding the dough adjustably mounted across said apron to be presented at different angles thereto.

4. In a bread-making machine, the combination with a dough-receiving feed-hopper, an apron-roller situated at the receiving end of said feed-hopper, a pair of dough-reducing rollers situated at the delivering end of said feed-hopper, of a traversing apron surrounding said apron-roller, extending over said feed-hopper and surrounding the bottom roller of said reducing-rollers, a feed-apron tension-roller extending transversely beneath said feed-hopper and contacting the under surface of said traversing feed-apron and means for adjustably supporting said tension-roller whereby the tension of said feed-apron may be regulated.

5. In a bread-making machine, the combination with a dough-receiving hopper and a pair of dough-reducing rollers, of a series of dough-equalizing rollers situated above said feed-hopper in front of said dough-reducing rollers, an apron extending from said reducing-rollers to receive the dough therefrom, and means for folding the dough adjustably mounted across said apron to be presented at different angles thereto.

6. In a bread-making machine, the combination with a dough-receiving feed-hopper and a pair of dough-reducing rollers, of a series of equalizing-rollers situated above said feed-hopper in front of said dough-reducing rollers and arranged in parallel relation to each other, an apron extending from said reducing-rollers to receive the dough therefrom, and means for folding the dough adjustably mounted across said apron to be presented at different angles thereto.

7. In a bread-making machine, the combination with a dough-reducing feed-hopper, a traversing feed-apron and a pair of dough-reducing rollers, of a series of equalizing-rollers situated above said feed-apron in front of said reducing-rollers and arranged in parallel relation to each other and means whereby said equalizing-rollers are positively driven at the same speed and in the same direction as said feed-apron.

8. In a bread-making machine, the combination with a feed-apron, a feed-hopper, and a pair of dough-reducing rollers, of a traversing dough-receiving apron situated at the delivering side of said dough-reducing rollers and a dough-folding traversing apron situated above and extending across said traversing dough-receiving apron.

9. In a bread-making machine, the combination, with a traversing feed-apron, its supporting-hopper and a pair of dough-reducing rollers, of a traversing dough-receiving apron situated at the delivering side of said reducing-rollers, a dough-folding traversing apron situated above and extending across said dough-receiving apron and means whereby said folding-apron can be adjusted in position relatively to said dough-receiving apron substantially as set forth.

10. In a bread-making machine, the combination with a traversing feed-apron, its supporting-hopper, a pair of dough-reducing rollers, and a traversing dough-receiving apron situated at the delivering side of said reducing-rollers, a series of apron-rollers extending longitudinally of and above said dough-receiving apron and arranged in pairs on opposite sides of the latter apron, and a tension-roller beneath said upper rollers and said dough-receiving apron and an apron surrounding said apron-rollers, substantially as set forth.

11. In a bread-making machine, the combination with a traversing feed-apron, its supporting-hopper, a pair of dough-reducing rollers, and a traversing dough-receiving apron situated at the delivering side of said dough-reducing rollers, of a series of apron-rollers extending longitudinally of and above said dough-receiving apron, said rollers arranged in pairs on opposite sides of the latter apron and adjustably supported in relation thereto, a tension-roller beneath said upper rollers and said dough-receiving apron, and an apron, as described, surrounding the series of rollers substantially as set forth.

12. In a bread-making machine, the combination with a feed-hopper, a pair of reducing-rollers and a dough-receiving traversing apron situated at the delivering side of said rollers, of a series of apron-guiding rollers extending longitudinally of and above said dough-receiving apron, said rollers arranged in opposing pairs on opposite sides of said dough-receiving apron, and an apron-driving roller adjacent to one of the pairs of apron-guiding rollers, a tension-roller beneath said apron-guiding rollers and a cross or folding apron arranged, as described, to surround all of said rollers, and means whereby all of said rollers and their surrounding apron, as an entire organization, may be tilted and swung to any angle with the surface of the main traversing apron or to the line of direction of the same.

13. In a bread-making machine, the combination with a feed-hopper, a pair of reducing-rollers and a dough-receiving traversing apron situated at the delivering side of said rollers, of a series of apron-guiding rollers extending longitudinally of and above said dough-receiving apron, said rollers arranged in opposite pairs on opposite sides of said dough-receiving apron, a diagonally-extending roller situated intermediate the opposing pairs of said side rollers and contacting with the upper surface of the folding-apron, an apron-driving roller adjacent to one of the pairs of apron-guiding rollers, a tension-roller beneath said apron-guiding rollers, and a cross or folding apron arranged, as described, to surround all of said rollers, and means whereby all said rollers and their surrounding apron, taken as an entire organization, may be tilted or swung to any angle with the surface of the main traversing apron or to the line of direction of the same.

14. In a bread-making machine, the combination with a feed-hopper, a pair of reducing-rollers and a dough-receiving traversing apron situated at the delivering side of said rollers, of a means situated adjacent to and on the delivering side of said rollers for rolling or folding the dough on said receiving-apron as it is delivered from said reducing-rollers, said rolling or folding means being adjustably mounted relatively to said apron to be presented at various angles thereto.

15. In a bread-making machine, the combination with a feed-hopper, a pair of reducing-rollers and a means for conveying the dough, as it is reduced, from said rollers, of a means for folding said dough as it is delivered from said rollers, said rolling or folding means being adjustably mounted relatively to said apron to be presented at various angles thereto.

16. In a bread-making machine the combination with a traversing feeding-apron, a traversing receiving-apron, and a pair of reducing-rollers between said feeding and receiving aprons, of a stripping means on the delivering side of and contiguous to the lower of said reducing-rollers, and whereby the dough is stripped or removed from the delivering side of said lower roller as it is discharged from the latter, and means for rolling or folding the dough as it is delivered from said rollers to said apron, said means being adjustably mounted relatively to said apron.

17. In a bread-making machine, the combination with a traversing feeding-apron, a traversing receiving-apron, and a pair of reducing-rollers between said feeding and receiving aprons, of a continuously-rotating stripping-brush on the delivering side of and contiguous to the lower of said dough-receiving rollers and whereby the dough is stripped or removed from the delivering side of said roller as it is discharged, and means for rolling or folding the dough as it is delivered from said rollers to said apron, said means being adjustably mounted relatively to said apron.

18. In a bread-making machine, the combination with a traversing feeding-apron, and a pair of dough-reducing rollers, of a dough-receiving traversing apron contiguous to the delivering side of said reducing-rollers, said apron extending forwardly and beneath said reducing-rollers, then backwardly beyond and rearwardly of said reducing-rollers, suitable apron-rollers situated one in advance of and one rearwardly of said reducing-rollers, suitable intermediate guiding-rollers situated at the delivering side of said reducing-rollers whereby said traversing apron is guided round the under side of said reducing-rollers, and means situated beneath and in advance of said reducing-rollers whereby the top surface of said traversing apron is dusted or floured to receive the dough as it is discharged from said reducing-rollers.

19. In a bread-making machine, the combination with a traversing apron and a feed-hopper, a pair of reducing-rollers, a traversing receiving-apron and its supporting-table, of means for folding or rolling the dough and for centering the same on said traversing apron, and a die or forming means, said folding and centering means having a yielding movement to compensate for inequalities in the dough.

20. In a bread-making machine, the combination with a dough-hopper, a pair of reducing-rollers arranged contiguous thereto, a receiving-apron situated on the delivery side of said reducing-rollers and upon which the dough is discharged from the latter, and means for folding the dough upon said receiving-apron, of means for trimming the dough in its passage along said apron and after the dough has left the folding means, and means for dividing the dough into predetermined lengths.

21. In a bread-making machine, the combination with a dough-hopper, a pair of reducing-rollers arranged contiguous thereto, a receiving-apron situated on the delivery side of said reducing-rollers and upon which the dough is discharged from the latter, and means for folding the dough upon said receiving-apron, of means for trimming the dough in its passage along said apron and after the dough has left the folding means, means for dividing the dough into predetermined lengths, and means for driving said dividing means at variable speeds.

22. In a bread-making machine, the combination with a traversing feed-apron, its supporting-hopper, a pair of reducing-rollers, and a traversing receiving-apron situated on the delivering side of said reducing-rollers, of a dough-forming and a dough-centering means, a trimming means, a vertically-reciprocating knife, means for continuously reciprocating said knife, and means for varying the speed of said reciprocating means.

23. In a bread-making machine, the combination with a traversing feed-apron, its supporting-hopper, a pair of reducing-rollers, and a traversing receiving-apron situated on the delivering side of said reducing-rollers, of a dough forming or folding means and a dough-centering means, a forming-die composed of a pair of side vertically-extending rollers and an upper horizontally-extending roller all of which rollers arranged in a vertical plane and adapted to rotate simultaneously at the same speed, a dividing-knife, means for continuously reciprocating said knife and means for varying the speed of said reciprocating means.

24. In a bread-making machine, the combination with a traversing feed-apron, its supporting-hopper, a pair of reducing-rollers and a traversing receiving-apron situated at the delivering side of said reducing-rollers, of a dough forming or folding means and a centering means, a forming-die composed of a pair of side vertically-extending rollers, and an upper horizontally-extending roller, all of which rollers arranged in the same vertical plane and adapted to rotate simultaneously at the same speed, a transversely-extending flattening-roller adjacent to said die-rollers, a dividing-knife, means for continuously reciprocating said knife, and means for varying the speed of said reciprocating means.

25. In a bread-making machine, the combination with a traversing feed-apron, its supporting-hopper, a pair of reducing-rollers and a traversing receiving-apron situated at the delivering side of said reducing-rollers, of a dough forming or folding means and a centering means, a forming-die composed of a pair of side vertically-extending rollers, and an upper horizontally-extending roller, all of which rollers arranged in the same vertical plane and adapted to rotate simultaneously at the same speed, a transversely-extending flattening-roller adjacent to said die-rollers, a dividing-knife, means for continuously and positively rotating said flattening-roller, means for continuously reciprocating said knife, and means for varying the speed of said reciprocating means.

26. In a bread-making machine, the combination with a dough reducing and forming means, a traversing and dough-receiving apron and a forming-die composed of a pair of side vertically-extending rollers and an upper horizontally-extending roller, all of which rollers arranged in a vertical plane and adapted to rotate simultaneously at the same uniform speed, of a dividing-knife, means for continuously reciprocating said knife, and means for varying the speed of said reciprocating means.

27. In a bread-making machine, the combination with a dough reducing and forming means, a traversing and dough-receiving apron and a forming-die composed of a pair of side vertically-extending rollers and an upper horizontally-extending roller, all of which rollers arranged in a vertical plane and driven positively to rotate simultaneously at the same uniform speed and equal to the speed of the traversing apron, of a transversely-extending flattening-roller adjacent to said die-rollers, a pair of trimming-disks provided with blunt trimming peripheral edges, means for rotating said flattening-roller and said trimming-disks at the same peripheral speed as the lineal speed of the traversing apron, a dividing-knife, means for continuously reciprocating said knife, and means for varying the speed of said reciprocating means.

28. In a bread-making machine, the combination with a primary traversing receiving-apron, its supporting-table, a dough-forming means, and a continuously-operating dividing-knife, of a secondary traversing dough-receiving apron contiguous to said primary traversing apron and means whereby said secondary apron is traversed at a greater speed than the said primary apron.

29. In a bread-making machine, the combination with a primary traversing dough-receiving apron, its supporting-table, a dough-forming means, and a continuously-operating dividing-knife, of a secondary traversing dough-receiving apron contiguous to said primary apron, a transversely-extending conducting-roller, a working roller contiguous to said conducting-roller and parallel therewith, and means whereby said rollers are driven positively to rotate said conducting-roller in the same direction and at the same speed as said secondary apron, and the working roller is rotated in a direction opposed to said apron.

30. In a bread-making machine, the combination with a primary traversing dough-receiving apron, its supporting-table, a dough-forming means, and a continuously-operating dividing-knife, of a secondary traversing dough-receiving apron contiguous to said primary apron, a transversely-extending conducting-roller, a working roller contiguous to said conducting-roller and parallel therewith, and means whereby said rollers are driven positively to rotate said conducting-roller in the same direction and at the same speed as the secondary apron and whereby the working roller is rotated in an opposite direction to said conducting-roller and simultaneously therewith, and suitable means whereby said rollers are continuously dusted or floured.

31. In a bread-making machine, the combination with a primary traversing dough-receiving apron, its supporting-table, a dough-forming means, and a series of rotating trimming-disks, and a continuously-operating dividing-knife, of means for cleaning said trimming-disks and said dividing-knife, and a means for dusting or flouring the same.

32. In a bread-making machine, the combination with a primary traversing apron, its supporting-table, a dough-forming means, a dough-trimming means, and a continuously-operating dividing-knife, of means for cleaning said trimming-disks, and said dividing-knife, a dough-turning means adjacent to and to the rear of said dividing-knife, and a dough-forming means situated rearwardly of said turning means.

33. In a bread-making machine, the combination with a primary traversing or dough-carrying apron, a dough-forming means and a continuously-operating dividing-knife situated above said traversing apron and rearwardly of said forming means, of a dough-turning means situated above said apron, adjacent to and rearwardly of said dividing-knife, said turning means composed of a vertically-extending shaft and two depending turning-blades connected to the lower end of said shaft, said shaft and turning-blades connected thereto having a motion of rotation round their common axis and an upward motion of translation along said axis, a secondary traversing apron adjacent to and rearwardly of said primary apron and dough-forming means situated above said secondary apron.

34. In a bread-making machine, the combination with a primary traversing or dough-carrying apron, a dough-forming means and a continuously-operating dividing-knife situated above said traversing apron and rearwardly of said forming means, of a dough-turning means situated above said apron, adjacent to and rearwardly of said dividing-knife, said turning means composed of a vertically-extending shaft and two depending turning-blades connected thereto, said shaft and turning-blades having a motion of rotation round their common axis and an upward motion of translation along said axis, means for driving said turning means, means for adjusting the movement of said blades of said turning mechanism, and a dough-forming means to the rear of said turning means.

35. In a bread-making machine, the combination with a primary traversing or dough-carrying apron, a dough-forming means situated above said primary apron, and a continuously-operating dividing-knife situated rearwardly of said forming means, of a secondary traversing dough receiving and delivering apron, a series of horizontally-extending forming-rollers adjustably supported above said secondary apron, an apron surrounding said forming-rollers, and means whereby said forming-rollers are simultaneously and positively driven in the same direction, and at the same speed.

36. In a bread-making machine, the combination with a primary traversing or dough-carrying apron, a dough-forming means situated above said primary apron, and a continuously-operating dividing-knife rearwardly of said forming means, and a dough-turning means situated rearwardly of said dividing-knife, of a secondary traversing or dough receiving and delivering apron, a series of horizontally and transversely extending forming-rollers situated above said latter apron, an apron surrounding said forming-rollers, means whereby said rollers are adjustably supported and driving means for continuously and simultaneously rotating said forming-rollers.

37. In a bread-making machine, the combination with a primary traversing or dough-carrying apron, a dough-forming means situated above said primary apron, and a continuously-operating dividing-knife, situated above said apron and rearwardly of said forming means, and a dough-turning means to the rear of said dividing-knife, of a secondary dough receiving and discharging apron, a series of horizontally and transversely extending forming-rollers situated above said secondary apron, an apron surrounding said forming-rollers, means whereby said rollers are adjustably supported, driving means for continuously and simultaneously rotating said forming-rollers, and a means for continuously dusting and flouring said forming-rollers' apron.

38. In a bread-making machine, the combination with a primary traversing or dough-carrying apron, a dough-forming means situated above said primary traversing apron, and a continuously-operating dividing-knife situated above said apron and to the rear of said forming means, a roller beneath said apron and directly under said knife, of a secondary dough-receiving traversing apron, and means for traversing said apron at a greater velocity than said primary apron.

39. In a bread-making machine, the combination with a primary traversing or dough-carrying apron, a dough-forming means situated above said primary apron, and a continuously-operating dividing-knife situated above said apron and rearwardly of said forming means, and a dough-turning means to the rear of said dividing-knife, of a secondary dough receiving and discharging apron, a series of horizontally and transversely extending forming-rollers situated above said secondary apron, an apron surrounding said forming-rollers, means whereby said rollers are adjustably supported, driving means for continuously and simultaneously rotating said forming-rollers in either direction, and a means for continuously dusting or flouring said forming-rollers.

40. In a bread-making machine, the combination with a primary traversing or dough-carrying apron, a dough-forming means situated above said primary apron, and a continuously-operating dividing-knife situated above said apron and rearwardly of said forming means, and a dough-turning means to the rear of said dividing-knife, of a secondary dough receiving and discharging apron, a series of horizontally and transversely extending forming-rollers situated above said secondary apron, an apron surrounding said rollers, means whereby said forming-rollers are adjustably supported, means whereby said forming-rollers are continuously rotated, means whereby said forming-rollers may be caused to rotate in either direction while the machine is in motion or at rest, and means for continuously dusting or flouring said forming-roller apron.

41. In a bread-making machine, the combination with a primary traversing or dough-carrying apron, its supporting-apron, a continuously-operating dough-forming means, a continuously-operating dividing-knife arranged at the rear of said dough-forming means, of a secondary traversing or dough receiving and discharging apron, a secondary apron-supporting table, the top surface of which latter may be either of a concave, convex, or plane form, and a series of positively-driven forming-rollers arranged in parallel relation and extending horizontally across said secondary apron and means for adjustably supporting said secondary apron.

42. In a bread-making machine, the combination with a primary traversing or dough-carrying apron, its supporting-table, a continuously-operating dough-forming means, a continuously-operating dividing-knife, of a secondary dough receiving and delivering apron, a dough-forming means composed of an exterior cone open at its top receiving end and at its bottom discharging end and an inner revolving cone supported centrally within said open-ended cone.

43. In a bread-making machine, the combination with a primary traversing or dough-carrying apron, its supporting-table, a continuously-operating dough-forming means, and a continuously-operating dividing-knife, of a secondary traversing receiving and delivering apron, a dough-forming means to the rear of said dividing-knife, composed of an exterior forming-cone open at its lower or base end and open at its upper smaller or top end, and a revolving cone adjustably supported within said open-ended cone, and means for positively rotating said inner cone.

44. In a bread-making machine, the combination with a primary traversing dough receiving or carrying apron, a dough-forming means, and a continuously-operating dividing-knife, of a secondary traversing receiving and delivering apron, a dough-forming means composed of an exterior revolving cone, open at its top and bottom ends, a revolving forming-cone adjustably supported within said open-ended cone, and means whereby said cones may be driven simultaneously in the same or different directions.

In testimony whereof I have hereunto set my hand in the presence of two subscribing witnesses.

CHRISTIAN KESSLER.

Witnesses:
 THOMPSON R. BELL,
 GEORGE HITZ.